(12) United States Patent
Dillaway et al.

(10) Patent No.: US 8,584,230 B2
(45) Date of Patent: *Nov. 12, 2013

(54) SECURITY AUTHORIZATION QUERIES

(75) Inventors: Blair B. Dillaway, Redmond, WA (US); Moritz Y. Becker, Cambridge (GB); Andrew D. Gordon, Cambridge (GB); Cedric Fournet, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,537

(22) Filed: Sep. 27, 2011

(65) Prior Publication Data

US 2012/0017263 A1    Jan. 19, 2012

Related U.S. Application Data

(63) Continuation of application No. 11/530,438, filed on Sep. 8, 2006, now Pat. No. 8,060,931.

(51) Int. Cl.
    *H04L 29/06* (2006.01)

(52) U.S. Cl.
    USPC .............................................. 726/21; 726/10

(58) Field of Classification Search
    None
    See application file for complete search history.

(56) References Cited

U.S. PATENT DOCUMENTS

| | | | |
|---|---|---|---|
| 4,868,877 A | 9/1989 | Fischer | |
| 5,214,702 A | 5/1993 | Fischer | |
| 5,649,099 A | 7/1997 | Theimer et al. | |
| 5,765,153 A | 6/1998 | Benantar et al. | |
| 6,189,103 B1 | 2/2001 | Nevarez et al. | |
| 6,216,231 B1 | 4/2001 | Stubblebine | |
| 6,256,734 B1 | 7/2001 | Blaze et al. | |
| 6,256,741 B1 | 7/2001 | Stubblebine | |
| 6,367,009 B1 | 4/2002 | Davis et al. | |
| 6,484,261 B1 | 11/2002 | Wiegel | |
| 6,779,120 B1 | 8/2004 | Valente et al. | |
| 6,895,503 B2 | 5/2005 | Tadayon et al. | |
| 6,931,530 B2 | 8/2005 | Pham et al. | |
| 6,976,009 B2 | 12/2005 | Tadayon et al. | |
| 7,085,741 B2 | 8/2006 | Lao et al. | |
| 7,127,605 B1 | 10/2006 | Montgomery et al. | |
| 7,162,633 B2 | 1/2007 | Wang et al. | |
| 7,260,715 B1 | 8/2007 | Pasieka | |
| 7,290,138 B2 | 10/2007 | Freeman et al. | |
| 7,426,635 B1 | 9/2008 | Parkhill et al. | |

(Continued)

FOREIGN PATENT DOCUMENTS

| | | |
|---|---|---|
| JP | 2000235497 | 8/2000 |
| JP | 2001184264 | 7/2001 |

(Continued)

OTHER PUBLICATIONS

Chinese Office Action mailed Sep. 13, 2012 for Chinese patent application No. 200780033359.7, a counterpart foreign application of US patent No. 8,201,215, 9 pages.

(Continued)

*Primary Examiner* — David Pearson
(74) *Attorney, Agent, or Firm* — Lee & Hayes, PLLC

(57) ABSTRACT

In an example implementation, a bifurcated security scheme has a first level that does not allow usage of negations and a second level that does permit usage of negations. In another example implementation, an authorization query table maps respective resource-specific operations to respective associated authorization queries. In yet another example implementation, authorization queries are permitted to have negations, but individual assertions are not.

20 Claims, 10 Drawing Sheets

(56) References Cited

U.S. PATENT DOCUMENTS

| | | |
|---|---|---|
| 7,437,421 B2 | 10/2008 | Bhogal et al. |
| 7,506,364 B2 | 3/2009 | Vayman |
| 7,509,489 B2 | 3/2009 | Kostal et al. |
| 7,512,782 B2 | 3/2009 | Kaler et al. |
| 7,533,265 B2 | 5/2009 | Ballinger et al. |
| 7,543,140 B2 | 6/2009 | Dillaway et al. |
| 7,644,284 B1 | 1/2010 | Stubblebine |
| 7,814,534 B2 | 10/2010 | Dillaway |
| 7,844,610 B2 | 11/2010 | Hillis et al. |
| 2001/0018675 A1 | 8/2001 | Blaze et al. |
| 2002/0087859 A1 | 7/2002 | Weeks et al. |
| 2002/0109707 A1 | 8/2002 | Lao et al. |
| 2002/0129135 A1 | 9/2002 | Delany et al. |
| 2002/0184160 A1 | 12/2002 | Tadayon et al. |
| 2002/0184517 A1 | 12/2002 | Tadayon et al. |
| 2003/0083877 A1 | 5/2003 | Sugimoto |
| 2003/0110192 A1 | 6/2003 | Valente et al. |
| 2003/0115292 A1 | 6/2003 | Griffin et al. |
| 2003/0120955 A1 | 6/2003 | Bartal et al. |
| 2003/0149714 A1 | 8/2003 | Casati et al. |
| 2003/0225697 A1 | 12/2003 | DeTreville |
| 2003/0229781 A1 | 12/2003 | Fox et al. |
| 2004/0024764 A1 | 2/2004 | Hsu et al. |
| 2004/0034770 A1 | 2/2004 | Kaler et al. |
| 2004/0034774 A1 | 2/2004 | Le Saint |
| 2004/0064707 A1 | 4/2004 | McCann et al. |
| 2004/0068757 A1 | 4/2004 | Heredia |
| 2004/0122958 A1 | 6/2004 | Wardrop |
| 2004/0123154 A1 | 6/2004 | Lippman et al. |
| 2004/0128393 A1 | 7/2004 | Blakley, III et al. |
| 2004/0128546 A1 | 7/2004 | Blakley, III et al. |
| 2004/0139352 A1 | 7/2004 | Shewchuk et al. |
| 2004/0162985 A1 | 8/2004 | Freeman et al. |
| 2004/0181665 A1 | 9/2004 | Houser |
| 2004/0210756 A1 | 10/2004 | Mowers et al. |
| 2004/0221174 A1 | 11/2004 | Le Saint et al. |
| 2004/0243811 A1 | 12/2004 | Frisch et al. |
| 2004/0243835 A1 | 12/2004 | Terzis et al. |
| 2004/0250112 A1 | 12/2004 | Valente et al. |
| 2005/0015586 A1 | 1/2005 | Brickell |
| 2005/0033813 A1 | 2/2005 | Bhogal et al. |
| 2005/0055363 A1 | 3/2005 | Mather |
| 2005/0066198 A1 | 3/2005 | Gelme et al. |
| 2005/0071280 A1 | 3/2005 | Irwin et al. |
| 2005/0079866 A1 | 4/2005 | Chen et al. |
| 2005/0080766 A1 | 4/2005 | Ghatare |
| 2005/0097060 A1 | 5/2005 | Lee et al. |
| 2005/0108176 A1 | 5/2005 | Jarol et al. |
| 2005/0132220 A1 | 6/2005 | Chang et al. |
| 2005/0138357 A1 | 6/2005 | Swenson et al. |
| 2005/0187877 A1 | 8/2005 | Tadayon et al. |
| 2005/0188072 A1 | 8/2005 | Lee et al. |
| 2005/0198326 A1 | 9/2005 | Schlimmer et al. |
| 2005/0220304 A1 | 10/2005 | Lenoir et al. |
| 2006/0005010 A1 | 1/2006 | Olsen et al. |
| 2006/0005227 A1 | 1/2006 | Samuelsson et al. |
| 2006/0015728 A1 | 1/2006 | Ballinger et al. |
| 2006/0026667 A1 | 2/2006 | Bhide et al. |
| 2006/0041421 A1 | 2/2006 | Ta et al. |
| 2006/0041929 A1 | 2/2006 | Della-Libera et al. |
| 2006/0048216 A1 | 3/2006 | Hinton et al. |
| 2006/0075469 A1 | 4/2006 | Vayman |
| 2006/0101521 A1 | 5/2006 | Rabinovitch |
| 2006/0106856 A1 | 5/2006 | Bermender et al. |
| 2006/0129817 A1 | 6/2006 | Borneman et al. |
| 2006/0136990 A1 | 6/2006 | Hinton et al. |
| 2006/0156391 A1 | 7/2006 | Salowey |
| 2006/0195690 A1 | 8/2006 | Kostal et al. |
| 2006/0200664 A1 | 9/2006 | Whitehead et al. |
| 2006/0206707 A1 | 9/2006 | Kostal et al. |
| 2006/0206925 A1 | 9/2006 | Dillaway et al. |
| 2006/0206931 A1 | 9/2006 | Dillaway et al. |
| 2006/0225055 A1 | 10/2006 | Tieu |
| 2006/0230432 A1 | 10/2006 | Lee et al. |
| 2006/0236382 A1 | 10/2006 | Hinton et al. |
| 2006/0242075 A1 | 10/2006 | Ginter et al. |
| 2006/0242162 A1 | 10/2006 | Conner et al. |
| 2006/0242688 A1 | 10/2006 | Paramasivam et al. |
| 2006/0259776 A1 | 11/2006 | Johnson et al. |
| 2007/0006284 A1 | 1/2007 | Adams et al. |
| 2007/0043607 A1 | 2/2007 | Howard et al. |
| 2007/0055887 A1 | 3/2007 | Cross et al. |
| 2007/0056019 A1 | 3/2007 | Allen et al. |
| 2007/0061872 A1 | 3/2007 | Carter |
| 2007/0143835 A1 | 6/2007 | Cameron et al. |
| 2007/0169172 A1 | 7/2007 | Backes et al. |
| 2007/0199059 A1 | 8/2007 | Takehi |
| 2007/0283411 A1 | 12/2007 | Paramasivam et al. |
| 2007/0300285 A1 | 12/2007 | Fee et al. |
| 2008/0066158 A1 | 3/2008 | Dillaway et al. |
| 2008/0066159 A1 | 3/2008 | Dillaway et al. |
| 2008/0066160 A1 | 3/2008 | Becker et al. |
| 2008/0066169 A1 | 3/2008 | Dillaway et al. |
| 2008/0066175 A1 | 3/2008 | Dillaway et al. |
| 2008/0097748 A1 | 4/2008 | Haley et al. |
| 2008/0127320 A1 | 5/2008 | De Lutiis et al. |
| 2008/0172721 A1 | 7/2008 | Noh et al. |
| 2009/0126022 A1 | 5/2009 | Sakaki |

FOREIGN PATENT DOCUMENTS

| | | |
|---|---|---|
| JP | 2002163235 | 6/2002 |
| JP | 2004206187 | 7/2004 |
| JP | 2005141746 | 6/2005 |
| JP | 2005309780 | 11/2005 |
| JP | 2005332049 | 12/2005 |
| JP | 2006221506 | 8/2006 |
| WO | WO0056027 | 9/2000 |
| WO | WO2006116103 | 11/2006 |
| WO | WO2008030876 | 3/2008 |
| WO | WO2008031043 | 3/2008 |

OTHER PUBLICATIONS

Israeli Office Action mailed Aug. 13, 2012 for Israeli patent application No. 196524, a counterpart foreign application of U.S. Appl. No. 11/530,556, 2 pages.

Office action for U.S. Appl. No. 11/530,427, mailed on Oct. 30, 2012, Dillaway et al., "Variable Expressions in Security Assertions", 23 pages.

Office action for U.S. Appl. No. 11/530,556, mailed on Sep. 24, 2012, Becker et al., "Security Language Translations with Logic Resolution", 9 pages.

Office action for U.S. Appl. No. 11/530,564, mailed on Sep. 27, 2012, Becker et al., "Security Language Expressions for Logic Resolution", 14 pages.

European Office Action mailed Dec. 22, 2011 for European patent application No. 07841896.9, a counterpart foreign application of US patent No. 8,060,931, 4 pages.

Abadi, "Logic in Access Control", Proceedings 18th Annual IEEE Symposium on Logic in Computer Science, Jun. 22-25, 2003, Ottawa, Ontario, Canada, pp. 228-233.

Becker, et al., "SecPAL: Design and Semantics of a Decentralized Authorization Language—Technical Report MSR-TR-2006-120", Sep. 1, 2006, Microsoft Research, Cambridge, UK, retrieved from the Internet at http://courses.cs.vt.edu/cs5204/fall10-kafura-NVC/Papers/Security/SecPal-Reference.pdf on Dec. 21, 2011, 46 pgs.

Chen, et al., "Tabled Evaluations with Delaying for General Logic Programs", Journal of the ACM, vol. 43, No. 1, Jan. 1996, pp. 20-74.

Chinese Office Action mailed Jan. 30, 2012 for Chinese patent application No. 201110162110.4, a counterpart foreign application of US patent No. 8,060,931, 6 pages.

Chinese Office Action mailed Apr. 5, 2012 for Chinese patent application No. 200780033359.7, a counterpart foreign application of U.S. Appl. No. 11/530,446, 9 pages.

European Office Action mailed Apr. 19, 2012 for European patent application No. 07842066.8, a counterpart foreign application of U.S. Appl. No. 11/530,446, 5 pages.

Extended European Search Report mailed Jan. 18, 2012 for European patent application No. 07842186.4, 9 pages.

(56) References Cited

OTHER PUBLICATIONS

Geuer-Pollmann, et al., "Web Services and Web Service Security Standards", Elsevier Advanced Technology Publications, Journal of Information Security Technology Report, Jan. 2005, vol. 10, Issue 1, pp. 15-24.
Haidar, et al., "An Extended RBAC Profile of XACML", In the Proceedings of the 3rd ACM Workshop on Secure Web Services, Nov. 2006, pp. 13-22.
Israeli Office Action mailed Mar. 19, 2012 for Israel patent application No. 196407, a counterpart foreign application of U.S. Appl. No. 11/530,446, 4 pages.
Israeli Office Action mailed Mar. 20, 2012 for Israel patent application No. 196524, a counterpart foreign application of U.S. Appl. No. 11/530,556, 1 page.
Translated Japanese Office Action mailed Jan. 24, 2012 for Japanese patent application No. 2009-527617, a counterpart foreign application of U.S. Appl. No. 11/530,556, 14 pages.
Office Action for U.S. Appl. No. 11/530,543, mailed on Apr. 16, 2012, Blair B. Dillaway, "Composable Security Policies", 12 pgs.
Pimlott, et al., "Soutei, a Logic-Based Trust-Management System", Functional and Logic Programming, 8th International Symposium, FLOPS 2006 Proceedings, LNCS 3945, Apr. 24-26, 2006, pp. 130-145.
Israeli Office Action mailed May 6, 2012 for Israeli patent application No. 196408, a counterpart foreign application of US patent No. 8,060,931, 5 pages.
Translated Japanese Office Action mailed Jun. 29, 2012 for Japanese patent application No. 2009-527617, a counterpart foreign application of U.S. Appl. No. 11/530,556, 6 pages.
Ardagna, et al., "XML-based Access Control Languages", retrieved at <<http://seclab.dti.unimi.it/Papers/RI-3.pdf>>, Information Security Technical Report, vol. 9, Issue 3, Jul.-Sep. 2004, pp. 1-14.
Becker, et al., "Cassandra: Distributed Access Control Policies with Tunable Expressiveness", IEEE 5th International Workshop on Policies for Distributed Systems and Networks, Jun. 2004, pp. 159-168.
Becker, et al., "Cassandra: Flexible Trust Management, Applied to Electronic Health Records", IEEE Computer Security Foundations Workshop, Jun. 2004, pp. 139-154.
OASIS, "Bindings for the OASIS Security Assertion Markup Language (SAML) V2.0", OASIS Standard, Mar. 15, 2005, 46 pgs.
Blaze, et al., "Decentralized Trust Management", IEEE Symposium on Security and Privacy, May 1996, pp. 164-173.
Blaze, et al., "The Role of Trust Management in Distributed Systems Security", Book, Secure Internet Programming, 1999, pp. 185-210.
Cederquist et al., "An Audit Logic for Accountability", 6th IEEE Intl Workshop on Policies for Distributed Systems and Networks, Policy 2005, Jun. 2005, 10 pgs.
Chadwick, "An Authorisation Interface for the GRID", In the Proceedings of the E-Science All Hands Meeting, Nottingham, Sep. 2003, 14 pgs.
Chapin, et al., "Risk Assessment in Distributed Authorization", In the Proceedings of the 2005 ACM Workshop on Formal Methods in Security Engineering, Nov. 2005, pp. 33-41.
Translated Chinese Notice of Grant of Patent Right for Invention mailed Mar. 25, 2011 for Chinese Patent Application No. 200780033322.4 a counterpart foreign application for U.S. Appl. No. 11/530,438, 4 pages.
Translated Chinese Office Action mailed Jan. 26, 2011 for Chinese Patent Application No. 2007800333591, a counterpart foreign application for U.S. Appl. No. 11/530,446, 8 pages.
"eXtensible Rights Markup Language (XrML) 2.0 Specificaton Part II: Core Schema", ContentGuard, available at www.xrml.org, znob 20, 2001, 46 pgs.
Dai et al., "Logic Based Authorization Policy Engineering", Proc 6th World Multiconference on Systemics, Cybernetics and Informatics, Jul. 2002, , 9 pgs.
Damianou, et al., "Ponder: A Language for Specifying Security and Management Policies for Distributed Systems", retrieved at <<http://www.doc.ic.ac.uk/~ncd/policies/files/PonderSpec.pdf>>, Imperial College of Science, Technology and Medicine, London, U.K, Oct. 20, 2000, pp. 1-49.
DeTreville, "Binder, a Logic-Based Security Language", IEEE Computer Society, In the Proceedings of the 2002 IEEE Symposium on Security and Privacy, Mar. 2002, 10 pgs.
Ellison, et al., "RFC 2693—SPKI Certificate Theory", available at <<http://www.ietf.org/rfc/rfc2693.txt>>, accessed on Sep. 27, 2006, 38 pages.
Extended European Search Report dated Jul. 22, 2011 for European patent application No. 07842066.8, 8 pgs.
Erdos, et al., "Shibboleth-Architecture", Draft Version 4, Nov. 2001, 39 pgs.
Farrell et al., "Assertions and Protocols for the OASIS Security Assertion Markup Language (SAML) V2.0", OASIS Open, 2004, Aug. 2004, 87 pgs.
Office Action from the U.S. Patent and Trademark Office for U.S. Appl. No. 11/530,556 mailed on Feb. 4, 2011, 8 pages.
Office Action from the U.S. Patent and Trademark Office for U.S. Appl. No. 11/530,438, mailed Oct. 29, 2010, 23 pages.
Office Action from the U.S. Patent and Trademark Office for U.S. Appl. No. 11/530,443, mailed Dec. 7, 2010, 16 pgs.
Office Action from the U.S. Patent and Trademark Office for U.S. Appl. No. 11/530,543, mailed on Dec. 27, 2010, 10 pgs.
Office Action from the U.S. Patent and Trademark Office for U.S. Appl. No. 11/530,433, mailed Mar. 1, 2009, 25 pages.
Office Action from the U.S. Patent and Trademark Office for U.S. Appl. No. 11/530,429, mailed on Mar. 2, 2010, 21 pages.
Office Action from the U.S. Patent and Trademark Office for U.S. Appl. No. 11/530,427, mailed Mar. 3, 2010, 23 pages.
Office Action from the U.S. Patent and Trademark Office for U.S. Appl. No. 11/530,446, mailed on Jul. 30, 2010, 25 pages.
Hallam-Baker et al., "Web Services Security: SAML Token Profile", OASIS Open, Sep. 23, 2002, 25 pgs.
Hallam-Barker, "Security Assertion Markup Language Straw-man Architecture", VeriSign, 2001, Feb. 16, 2001, 17 pgs.
Halpern, et al., "Using First-Order Logic to Reason About Policies", IEEE Computer Security Foundations Workshop, Jun. and Jul. 2003, available at <<http://arxiv.org/PS_cache/cs/pdf/0601/0601034.pdf>>, pp. 187-201.
Hughes et al., "Security Assertion Markup Language (SAML) 2.0 Technical Overview", OASIS, Jul. 2004, 36 pgs.
Jim, "SD3: A Trust Management System with Certified Evaluation", Proceedings of the 2001 IEEE Symposium on Security and Privacy, May 2001, available at <<http://www.research.att.com/~trevor/papers/JimOakland2001.pdf#search=%22%22SD3%3A%20A%20Trust%20 Management%20System%20with%20Certified%20 Evaluation%22%22>>, pp. 106-115.
Kagal, et al., "Trust-Based Security in Pervasive Computing Environments", IEEE Computer, Dec. 2011, vol. 34, No. 12, 4 pgs.
Keoh et al., "Towards Flexible Credential Verification in Mobile Ad-hoc Networks", ACM 2002, POMC '02, Oct. 30-31, 2002, pp. 58-pp. 65.
Lee, et al., "Security Assertion Exchange for the Agent on the Semantic Web", In the Proceedings of the IADIS International Conference WWW/Internet, Madrid, Spain, 2 Volumes, Oct. 2004, pp. 302-308 (9 pgs.).
Li, et al., "A Practically Implementable and Tractable Delegation Logic", IEEE Symposium on Security and Privacy, May 2000, available at <<http://www.cs.purdue.edu/homes/ninghui/papers/dl_oakland00.pdf>>, pp. 27-42.
Li, et al., "Datalog with Constraints: A Foundation for Trust Management Languages", Proc. PADL, Jan. 2003, available at <<http://www.cs.purdue.edu/homes/ninghui/papers/cdatalog_padl03.pdf#search=%22%22Datalog%20with%20Constraints%3A% 20A%20Foundation%20For%20Trust%20Management%20 Languages%22%22>>, pp. 58-73.
Li, et al., "Design of a Role-Based Trust Management Framework", Proceedings of the 2002 IEEE Symposium on Security and Privacy, Feb. 2002, available at <<http://www.cs.purdue.edu/homes/ninghui/papers/rt_oakland02.pdf#search=%22%22Design%20of%20a%20Role-Based%20Trust%20Management%20Framework%22%22>>, pp. 114-130.

(56) References Cited

OTHER PUBLICATIONS

Navarro et al., "Constrained delegation in XML-based Access Control and Digital Right Management Standards", Communication, Network and Information Security 2003, pp. 1-pp. 6.
Office Action from the U.S. Patent and Trademark Office for U.S. Appl. No. 11/530,433 mailed on Jan. 18, 2011, 22 pages.
Office Action from the U.S. Patent and Trademark Office for U.S. Appl. No. 11/530,429, mailed on Jan. 19, 2011, 22 pages.
Office Action from the U.S. Patent and Trademark Office for U.S. Appl. No. 11/530,446 mailed on Feb. 3, 2011, 26 pages.
Office Action from the U.S. Patent and Trademark Office for U.S. Appl. No. 11/530,427, mailed on Dec. 23, 2010, 23 pages.
Office Action from the U.S. Patent and Trademark Office for U.S. Appl. No. 11/530,446, mailed on Feb. 24, 2010, 19 pages.
Office Action from the U.S. Patent and Trademark Office for U.S. Appl. No. 11/530,439, mailed on Mar. 5, 2010, 20 pages.
Office Action from the U.S. Patent and Trademark Office for U.S. Appl. No. 11/530,438, mailed May 20, 2010, 21 pages.
Office Action from the U.S. Patent and Trademark Office for U.S. Appl. No. 11/530,443, mailed on Jun. 1, 2010, 14 pages.
Office Action from the U.S. Patent and Trademark Office for U.S. Appl. No. 11/530,543, mailed on Jul. 8, 2010, 9 pages.
Office Action from the U.S. Patent and Trademark Office for U.S. Appl. No. 11/530,427, mailed on Aug. 20, 2010, 15 pages.
Office Action from the U.S. Patent and Trademark Office for U.S. Appl. No. 11/530,429, mailed on Aug. 20, 2009, 16 pages.
Office Action from the U.S. Patent and Trademark Office for U.S. Appl. No. 11/530,433, mailed on Aug. 21, 2009, 16 pages.
Office Action from the U.S. Patent and Trademark Office for U.S. Appl. No. 11/530,556, mailed on Aug. 23, 2010, 7 pages.
Office Action from the U.S. Patent and Trademark Office for U.S. Appl. No. 11/530,564, mailed on Sep. 15, 2010, 8 pages.
Notice of Allowance from the U.S. Patent and Trademark Office for U.S. Appl. No. 11/530,438, mailed Apr. 4, 2011, 8 pages.
Notice of Allowance from the U.S. Patent and Trademark Office for U.S. Appl. No. 11/530,439, mailed Aug. 23, 2010, 13 pages.
Office Action for U.S. Appl. No. 11/530,564, mailed on Apr. 12, 2011, Moritz Becker, "Security Language Expressions for Logic Resolution", 8 pgs.
Non-Final Office Action for U.S. Appl. No. 11/530,443, mailed on May 26, 2011, Blair B. Dillaway, "Security Assertion Revocation", 15 pgs.
Final Office Action for U.S. Appl. No. 11/530,427, mailed on Jun. 29, 2011, Blair B. Dillaway, "Variable Expressions in Security Assertions", 19 pgs.
Final Office Action for U.S. Appl. No. 11/530,429, mailed on Jul. 8, 2011, Blair B. Dillaway, "Authorization Decisions with Principal Attributes", 20 pgs.
Final Office Action for U.S. Appl. 11/530,433, mailed on Jul. 8, 2011, Blair B. Dillaway, "Fact Qualifiers in Security Scenarios", 18 pgs.
Office Action for U.S. Appl. No. 12/902,892, mailed on Aug. 5, 2011, Blair B. Dillaway, "Auditing Authorization Decisions", 18 pgs.
"OASIS, Security Assertion Markup Language (SAML)", accessed on Sep. 27, 2006 from <<www.oasis-open.org/committees/security>>, 8 pages.
"OASIS", eXtensible Access Control Markup Language (XACML) Version 2.0 Core Specification, 2005, accessed on Sep. 27, 2006 at <<www.oasis-open.org/committees/xacml/>>, 6 pages.

Pfenning et al., "System Description: Twelf—A Meta-Logical Framework for Deductive Systems", Proc 16th Intl Conf on Automated Deduction, Jul. 1999, 5 pgs.
"RFC 3280—Internet X.409 Public Key Infrastructure Certificate and Certificate Revocation List (CRL) Profile", IEFT, retrieved on Sep. 22, 2006 from <<http://www.faqs.org/rfcs/rfc3280.html>>, Apr. 2002, 8 pages.
Ribeiro, et al., "SPL: An Access Control Language for Security Policies with Complex Constraints", retrieved at <<http://www.gsd.inesc-id.pt/~cnr/splii.pdf>>, IST/INESC, Network and Distributed System Security Symposium, Feb. 2001, pp. 1-22.
Rivest, et al., "SDSI—A Simple Distributed Security Infrastructure", available at <<http://theory.lcs.mit.edu/~rivest/sdsi10.ps>>, Apr. 30, 1996, pp. 1-37.
"Security Assertion Markup Language (SAML) 2.0 Technical Overview", OASIS, Working Draft 01, Jul. 22, 2004, pp. 1-36.
Stoller, "Trust Management A Tutorial", Stony Brook University, State University of New York, May 2006, 118 pgs.
Upadhyay, et al., "Generic Security Service API Version 2: Java Bindings Update: draft-ietf-kitten-rfc2853bis-01.txt", IETF Standard-Working-Draft, Internet Engineering Task Force, IETF, CH, vol. kitten, No. 1, Jan. 27, 2006, 96 pgs.
Wainer, et al., "A Fine-Grained, Controllable, User-to-User Delegatino Method in RBAC", Proceedings of the Tenth ACM Symposium on Access Control Models and Technologies, SACMAT, Jan. 1, 2005, 8 pgs.
Wang et al., "Extending the Security Assertion Markup Language to Support Delegation for Web Services and Grid Services", IEEE Internation Conference on Web Services 2005, Orlando, Fl, Jul. 12-15, 2005, 8 pgs.
Whitehead et al., "By Reason and Authority: A System for Authorization of Proof-Carrying Code", IEEE Computer Secuirty Foundations Workshop (CSFW04) Jun. 2004, 15 pgs.
Wu, et al., "Evaluation of Authorization-Authentication Tools: PERMIS, OASIS, XACML, and SHIBOLETH", Technical Report CS-TR-935, University of Newcastle upon Tyne, 2005.
Yin, et al., "A Rule-based Framework for Role based Constrained Delegation", Proceedings of the 3rd International Conference on Information Security, INFOSECU, Jan. 1, 2004, 6 pgs.
Translated Chinese Office Action mailed Aug. 25, 2011 for Chinese patent application No. 200780033359.7, a counterpart foreign application of U.S. Appl. No. 11/530,446, 15 pages.
ContentGuard, "eXtensibe rights Markup Language (XrML) 2.0 Specification Part 1: Primer", Nov. 20, 2001, pp. 1-39.
Non-Final Office Action for U.S. Appl. 11/530,446, mailed on Sep. 15, 2011, Blair B. Dillaway, "Controlling the Delegation of Rights", 30 pages.
Chinese Office Action mailed Mar. 13, 2013 for Chinese patent application No. 200780033359.7, a counterpart foreign application of US patent No. 8,201,215, 8 pages.
Translated Japanese Office Action mailed Oct. 26, 2012 for Japanese patent application No. 2009-527586, a counterpart foreign application of US patent No. 8,201,215, 7 pages.
Translated Japanese Office Action mailed Dec. 7, 2012 for Japanese patent application No. 2009-527540, a counterpart foreign application of US patent No. 8,060,931, 4 pages.
Office action for U.S. Appl. No. 11/530,433, mailed on Jan. 17, 2013, Dillaway et al., "Fact Qualifiers in Security Scenarios", 29 pages.
Office action for U.S. Appl. No. 11/530,429, mailed on Jan. 22, 2013, Dillaway et al., "Authorization Decisions with Principal Attributes", 23 pages.
Japanese Office Action mailed May 31, 2013 for Japanese patent application No. 2009-527586, a counterpart foreign application of US patent No. 8,201,215, 7 pages.
Ozeki, et al., "Distributed and Cooperative Information Protection for Interactive Services", Proceedings of the 66th (Heisei 16) National Convention of IPSJ (5), Special trucks (1), (2), (3), (4), and (5), pp. 5-37 to 5-40, Mar. 9, 2004, Japan.
Ozeki, et al., "Privacy Enhanced Distributed and Cooperative Mechanism", Proceedings of DBWeb 2003, Information Processing Society of Japan, vol. 2003, No. 18, pp. 155-162, Nov. 26, 2003.

Example Assertion Format

FIG. 7 — Example Authorization Query Ascertainment and Evaluation

SECURITY AUTHORIZATION QUERIES

CROSS-REFERENCE TO RELATED APPLICATIONS

This application is a continuation of, and claims priority to, U.S. patent application Ser. No. 11/530,438, filed Sep. 8, 2006, entitled "Security Authorization Queries", which application is incorporated herein in its entirety by reference.

BACKGROUND

Computers and other electronic devices are pervasive in the professional and personal lives of people. In professional settings, people exchange and share confidential information during project collaborations. In personal settings, people engage in electronic commerce and the transmission of private information. In these and many other instances, electronic security is deemed to be important.

Electronic security paradigms can keep professional information confidential and personal information private. Electronic security paradigms may involve some level of encryption and/or protection against malware, such as viruses, worms, and spyware. Both encryption of information and protection from malware have historically received significant attention, especially in the last few years.

However, controlling access to information is an equally important aspect of securing the safety of electronic information. This is particularly true for scenarios in which benefits are derived from the sharing and/or transferring of electronic information. In such scenarios, certain people are to be granted access while others are to be excluded.

Access control has been a common feature of shared computers and application servers since the early time of shared systems. There are a number of different approaches that have been used to control access to information. They share a common foundation in combining authentication of the entity requesting access to some resource with a mechanism of authorizing the allowed access. Authentication mechanisms include passwords, Kerberos, and x.509 certificates. Their purpose is to allow a resource-controlling entity to positively identify the requesting entity or information about the entity that it requires.

Authorization examples include access control lists (ACLs) and policy-based mechanisms such as the eXtensible Access Control Markup Language (XACML) or the PrivilEge and Role Management Infrastructure (PERMIS). These mechanisms define what entities may access a given resource, such as files in a file system, hardware devices, database information, and so forth. They perform this authorization by providing a mapping between authenticated information about a requestor and the allowed access to a resource.

As computer systems have become more universally connected over large networks such as the Internet, these mechanisms have proven to be somewhat limited and inflexible in dealing with evolving access control requirements. Systems of geographically dispersed users and computer resources, including those that span multiple administrative domains, in particular present a number of challenges that are poorly addressed by currently-deployed technology.

SUMMARY

In an example implementation, a bifurcated security scheme has a first level that does not allow usage of negations and a second level that does permit usage of negations. In another example implementation, an authorization query table maps respective resource-specific operations to respective associated authorization queries. In yet another example implementation, authorization queries are permitted to have negations, but individual assertions are not.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, protocol, etc. implementations are described herein.

BRIEF DESCRIPTION OF THE DRAWINGS

The same numbers are used throughout the drawings to reference like and/or corresponding aspects, features, and components.

DETAILED DESCRIPTION

Example Security Environments

Figure 1:
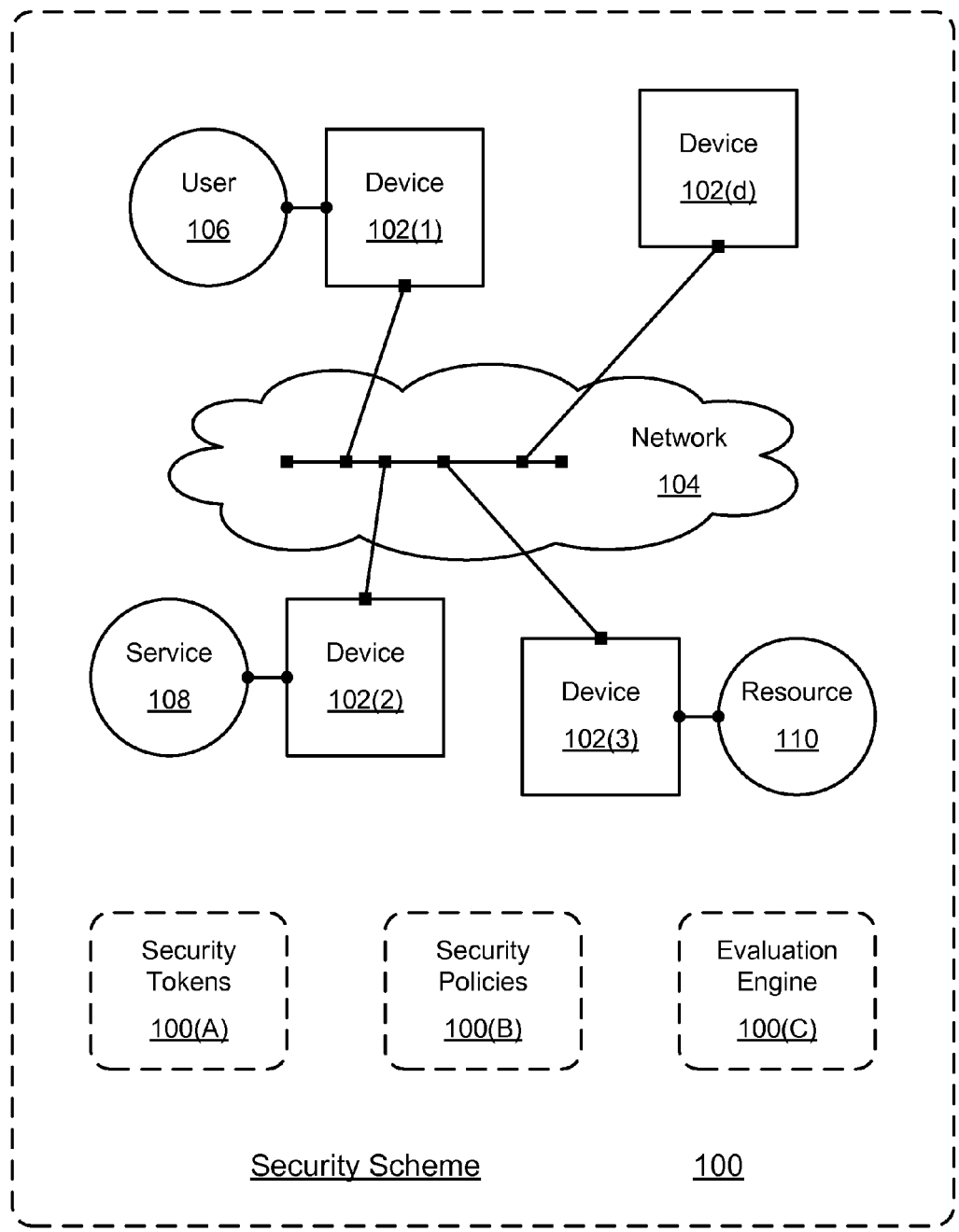
FIG. 1 is a block diagram illustrating an example general environment in which an example security scheme may be implemented.

FIG. 1 is a block diagram illustrating an example general environment in which an example security scheme 100 may be implemented. Security scheme 100 represents an integrated approach to security. As illustrated, security scheme 100 includes a number of security concepts: security tokens 100(A), security policies 100(B), and an evaluation engine 100(C). Generally, security tokens 100(A) and security policies 100(B) jointly provide inputs to evaluation engine 100(C). Evaluation engine 100(C) accepts the inputs and produces an authorization output that indicates if access to some resource should be permitted or denied.

In a described implementation, security scheme 100 can be overlaid and/or integrated with one or more devices 102, which can be comprised of hardware, software, firmware, some combination thereof, and so forth. As illustrated, "d"

devices, with "d" being some integer, are interconnected over one or more networks 104. More specifically, device 102(1), device 102(2), device 102(3) . . . device 102(d) are capable of communicating over network 104.

Each device 102 may be any device that is capable of implementing at least a part of security scheme 100. Examples of such devices include, but are not limited to, computers (e.g., a client computer, a server computer, a personal computer, a workstation, a desktop, a laptop, a palmtop, etc.), game machines (e.g., a console, a portable game device, etc.), set-top boxes, televisions, consumer electronics (e.g., DVD player/recorders, camcorders, digital video recorders (DVRs), etc.), personal digital assistants (PDAs), mobile phones, portable media players, some combination thereof, and so forth. An example electronic device is described herein below with particular reference to FIG. 4.

Network 104 may be formed from any one or more networks that are linked together and/or overlaid on top of each other. Examples of networks 104 include, but are not limited to, an internet, a telephone network, an Ethernet, a local area network (LAN), a wide area network (WAN), a cable network, a fibre network, a digital subscriber line (DSL) network, a cellular network, a Wi-Fi® network, a WiMAX® network, a virtual private network (VPN), some combination thereof, and so forth. Network 104 may include multiple domains, one or more grid networks, and so forth. Each of these networks or combination of networks may be operating in accordance with any networking standard.

As illustrated, device 102(1) corresponds to a user 106 that is interacting with it. Device 102(2) corresponds to a service 108 that is executing on it. Device 102(3) is associated with a resource 110. Resource 110 may be part of device 102(3) or separate from device 102(3).

User 106, service 108, and a machine such as any given device 102 form a non-exhaustive list of example entities. Entities, from time to time, may wish to access resource 110. Security scheme 100 ensures that entities that are properly authenticated and authorized are permitted to access resource 110 while other entities are prevented from accessing resource 110.

Figure 2:
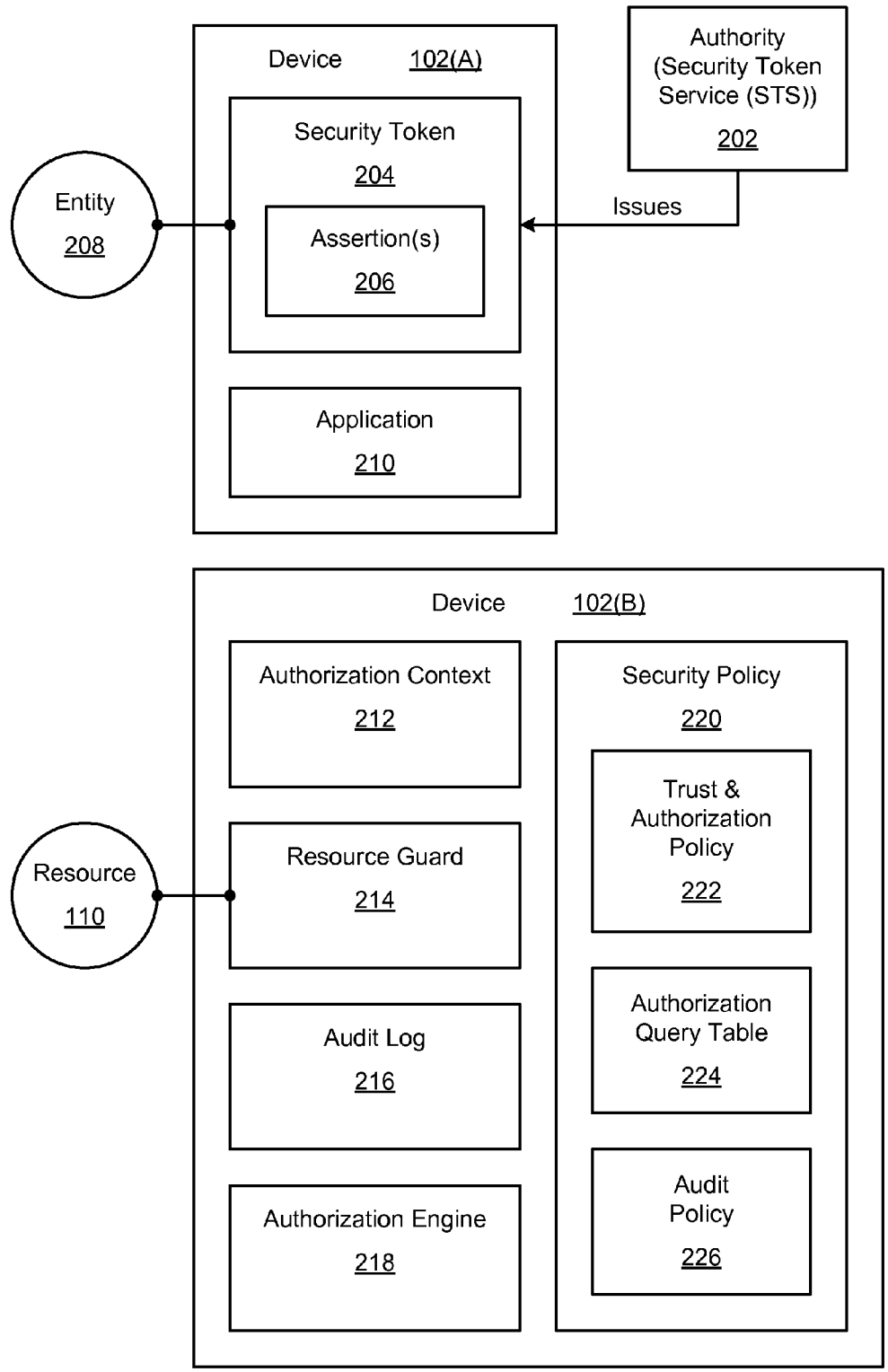
FIG. 2 is a block diagram illustrating an example security environment having two devices and a number of example security-related components.

FIG. 2 is a block diagram illustrating an example security environment 200 having two devices 102(A) and 102(B) and a number of example security-related components. Security environment 200 also includes an authority 202, such as a security token service (STS) authority. Device 102(A) corresponds to an entity 208. Device 102(B) is associated with resource 110. Although a security scheme 100 may be implemented in more complex environments, this relatively-simple two-device security environment 200 is used to describe example security-related components.

As illustrated, device 102(A) includes two security-related components: a security token 204 and an application 210. Security token 204 includes one or more assertions 206. Device 102(B) includes five security-related components: an authorization context 212, a resource guard 214, an audit log 216, an authorization engine 218, and a security policy 220. Security policy 220 includes a trust and authorization policy 222, an authorization query table 224, and an audit policy 226.

Each device 102 may be configured differently and still be capable of implementing all or a part of security scheme 100. For example, device 102(A) may have multiple security tokens 204 and/or applications 210. As another example, device 102(B) may not include an audit log 216 or an audit policy 226. Other configurations are also possible.

In a described implementation, authority 202 issues security token 204 having assertions 206 to entity 208. Assertions 206 are described herein below, including in the section entitled "Security Policy Assertion Language Example Characteristics". Entity 208 is therefore associated with security token 204. In operation, entity 208 wishes to use application 210 to access resource 110 by virtue of security token 204.

Resource guard 214 receives requests to access resource 110 and effectively manages the authentication and authorization process with the other security-related components of device 102(B). Trust and authorization policy 222, as its name implies, includes policies directed to trusting entities and authorizing actions within security environment 200. Trust and authorization policy 222 may include, for example, security policy assertions (not explicitly shown in FIG. 2). Authorization query table 224 maps requested actions, such as access requests, to an appropriate authorization query. Audit policy 226 delineates audit responsibilities and audit tasks related to implementing security scheme 100 in security environment 200.

Authorization context 212 collects assertions 206 from security token 204, which is/are used to authenticate the requesting entity, and security policy assertions from trust and authorization policy 222. These collected assertions in authorization context 212 form an assertion context. Hence, authorization context 212 may include other information in addition to the various assertions.

The assertion context from authorization context 212 and an authorization query from authorization query table 224 are provided to authorization engine 218. Using the assertion context and the authorization query, authorization engine 218 makes an authorization decision. Resource guard 214 responds to the access request based on the authorization decision. Audit log 216 contains audit information such as, for example, identification of the requested resource 110 and/or the algorithmic evaluation logic performed by authorization engine 218.

Figure 3:
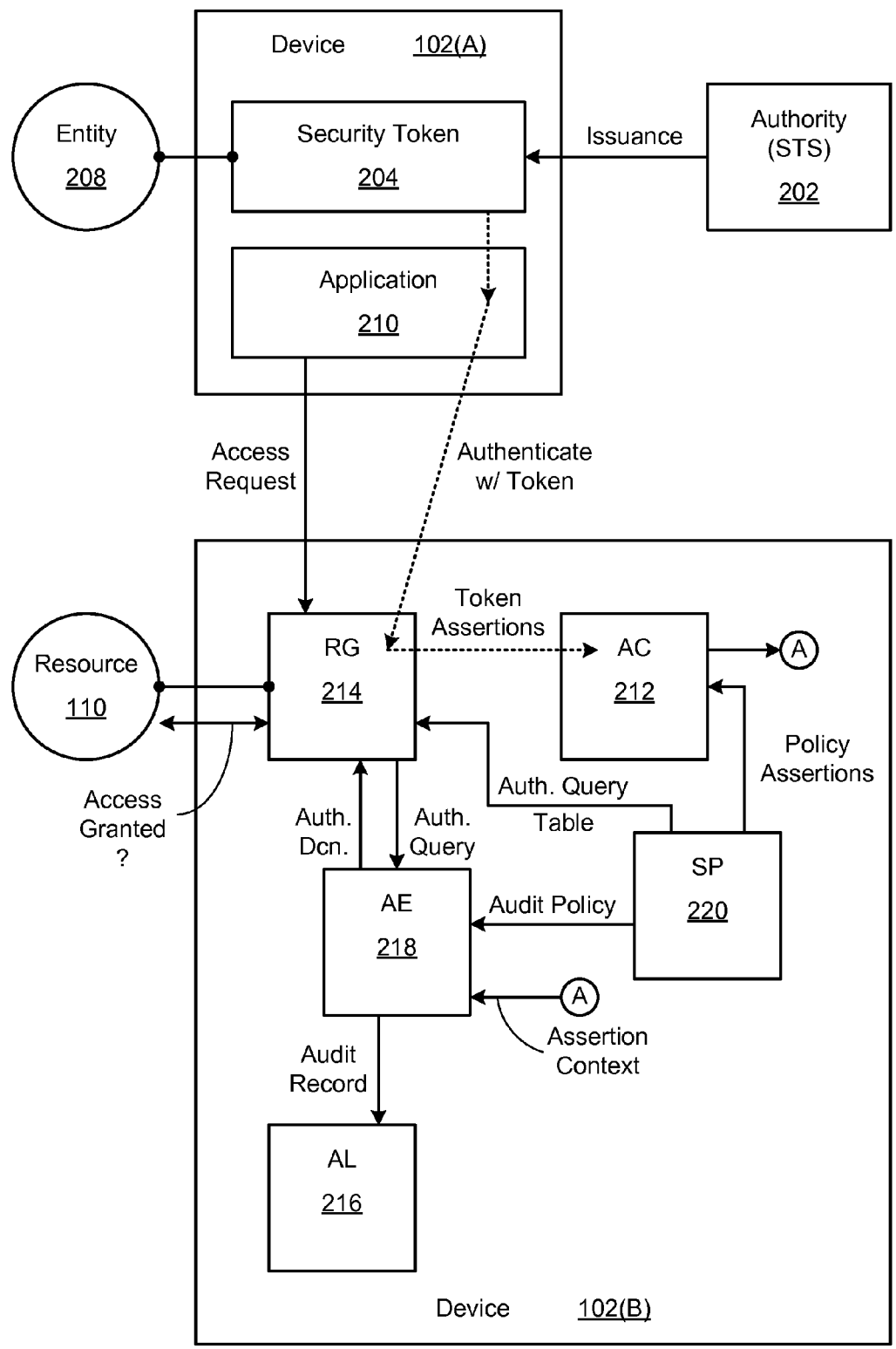
FIG. 3 is a block diagram illustrating the example security environment of FIG. 2 in which example security-related data is exchanged among the security-related components.

FIG. 3 is a block diagram illustrating example security environment 200 in which example security-related data is exchanged among the security-related components. The security-related data is exchanged in support of an example access request operation. In this example access request operation, entity 208 wishes to access resource 110 using application 210 and indicates its authorization to do so with security token 204. Hence, application 210 sends an access request* to resource guard 214. In this description of FIG. 3, an asterisk (i.e., "*") indicates that the stated security-related data is explicitly indicated in FIG. 3.

In a described implementation, entity 208 authenticates* itself to resource guard 214 with a token*, security token 204. Resource guard 214 forwards the token assertions* to authorization context 212. These token assertions are assertions 206 (of FIG. 2) of security token 204. Security policy 220 provides the authorization query table* to resource guard 214. The authorization query table derives from authorization query table module 224. The authorization query table sent to resource guard 214 may be confined to the portion or portions directly related to the current access request.

Policy assertions are extracted from trust and authorization policy 222 by security policy 220. The policy assertions may include both trust-related assertions and authorization-related assertions. Security policy 220 forwards the policy assertions* to authorization context 212. Authorization context 212 combines the token assertions and the policy assertions into an assertion context. The assertion context* is provided from authorization context 212 to authorization engine 218 as indicated by the encircled "A".

An authorization query is ascertained from the authorization query table. Resource guard 214 provides the authorization query (auth. query*) to authorization engine 218. Authorization engine 218 uses the authorization query and the assertion context in an evaluation algorithm to produce an authorization decision. The authorization decision (auth. dcn.*) is returned to resource guard 214. Whether entity 208 is granted access* to resource 110 by resource guard 214 is dependent on the authorization decision. If the authorization decision is affirmative, then access is granted. If, on the other hand, the authorization decision issued by authorization engine 218 is negative, then resource guard 214 does not grant entity 208 access to resource 110.

The authorization process can also be audited using semantics that are complementary to the authorization process. The auditing may entail monitoring of the authorization process and/or the storage of any intermediate and/or final products of, e.g., the evaluation algorithm logically performed by authorization engine 218. To that end, security policy 220 provides to authorization engine 218 an audit policy* from audit policy 226. At least when auditing is requested, an audit record* having audit information may be forwarded from authorization engine 218 to audit log 216. Alternatively, audit information may be routed to audit log 216 via resource guard 214, for example, as part of the authorization decision or separately.

Figure 4:
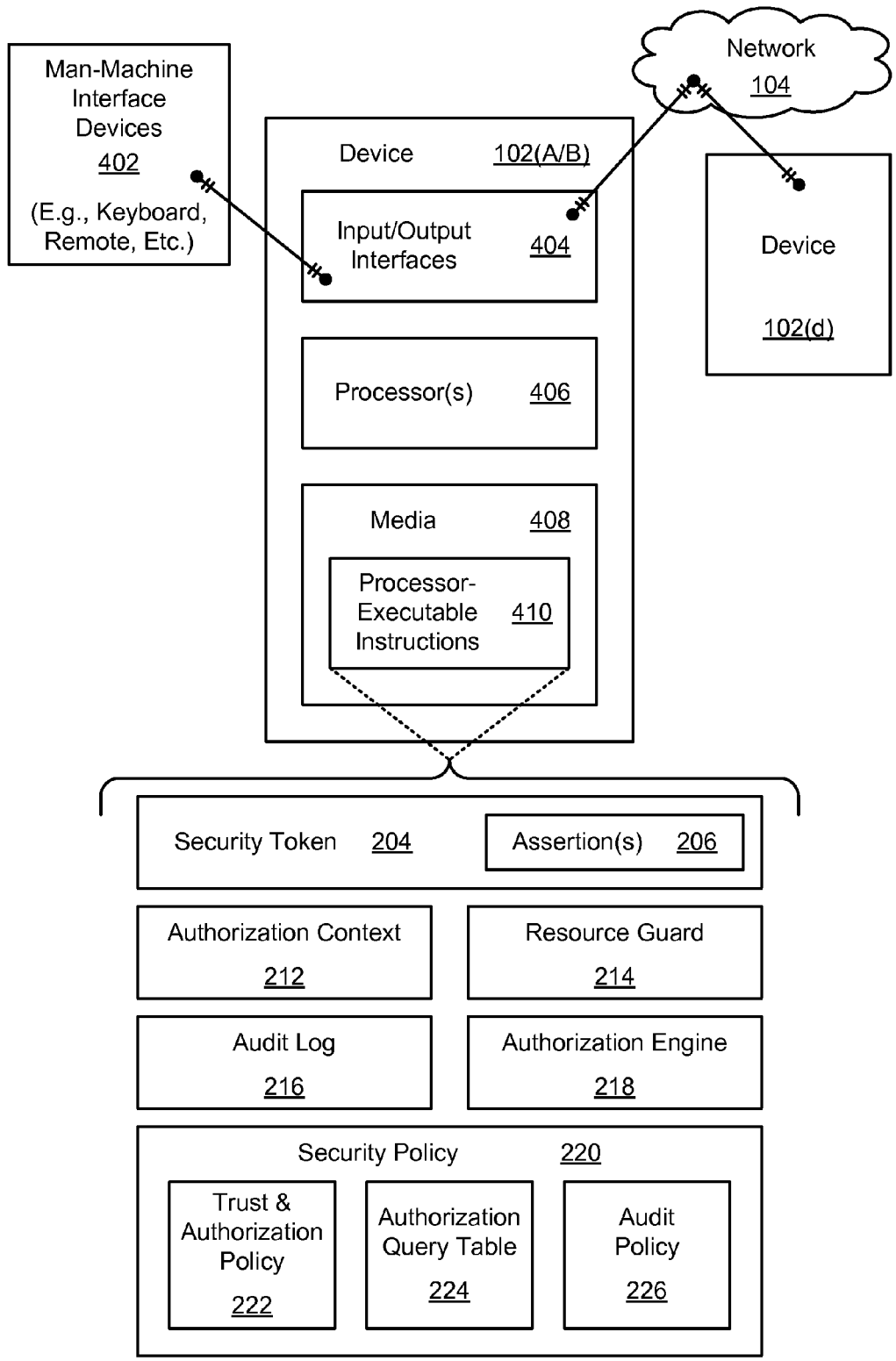
FIG. 4 is a block diagram of an example device that may be used for security-related implementations as described herein.

FIG. 4 is a block diagram of an example device 102 that may be used for security-related implementations as described herein. Multiple devices 102 are capable of communicating across one or more networks 104. As illustrated, two devices 102(A/B) and 102(d) are capable of engaging in communication exchanges via network 104. Although two devices 102 are specifically shown, one or more than two devices 102 may be employed, depending on the implementation.

Generally, a device 102 may represent any computer or processing-capable device, such as a client or server device; a workstation or other general computer device; a PDA; a mobile phone; a gaming platform; an entertainment device; one of the devices listed above with reference to FIG. 1; some combination thereof; and so forth. As illustrated, device 102 includes one or more input/output (I/O) interfaces 404, at least one processor 406, and one or more media 408. Media 408 include processor-executable instructions 410.

In a described implementation of device 102, I/O interfaces 404 may include (i) a network interface for communicating across network 104, (ii) a display device interface for displaying information on a display screen, (iii) one or more man-machine interfaces, and so forth. Examples of (i) network interfaces include a network card, a modem, one or more ports, and so forth. Examples of (ii) display device interfaces include a graphics driver, a graphics card, a hardware or software driver for a screen or monitor, and so forth. Printing device interfaces may similarly be included as part of I/O interfaces 404. Examples of (iii) man-machine interfaces include those that communicate by wire or wirelessly to man-machine interface devices 402 (e.g., a keyboard, a remote, a mouse or other graphical pointing device, etc.).

Generally, processor 406 is capable of executing, performing, and/or otherwise effectuating processor-executable instructions, such as processor-executable instructions 410. Media 408 is comprised of one or more processor-accessible media. In other words, media 408 may include processor-executable instructions 410 that are executable by processor 406 to effectuate the performance of functions by device 102.

Thus, realizations for security-related implementations may be described in the general context of processor-executable instructions. Generally, processor-executable instructions include routines, programs, applications, coding, modules, protocols, objects, components, metadata and definitions thereof, data structures, application programming interfaces (APIs), schema, etc. that perform and/or enable particular tasks and/or implement particular abstract data types. Processor-executable instructions may be located in separate storage media, executed by different processors, and/or propagated over or extant on various transmission media.

Processor(s) 406 may be implemented using any applicable processing-capable technology. Media 408 may be any available media that is included as part of and/or accessible by device 102. It includes volatile and non-volatile media, removable and non-removable media, and storage and transmission media (e.g., wireless or wired communication channels). For example, media 408 may include an array of disks/flash memory/optical media for longer-term mass storage of processor-executable instructions 410, random access memory (RAM) for shorter-term storing of instructions that are currently being executed, link(s) on network 104 for transmitting communications (e.g., security-related data), and so forth.

As specifically illustrated, media 408 comprises at least processor-executable instructions 410. Generally, processor-executable instructions 410, when executed by processor 406, enable device 102 to perform the various functions described herein, including those actions that are illustrated in the various flow diagrams. By way of example only, processor-executable instructions 410 may include a security token 204, at least one of its assertions 206, an authorization context module 212, a resource guard 214, an audit log 216, an authorization engine 218, a security policy 220 (e.g., a trust and authorization policy 222, an authorization query table 224, and/or an audit policy 226, etc.), some combination thereof, and so forth. Although not explicitly shown in FIG. 4, processor-executable instructions 410 may also include an application 210 and/or a resource 110.

Security Policy Assertion Language Example Characteristics

This section describes example characteristics of an implementation of a security policy assertion language (SecPAL). The SecPAL implementation of this section is described in a relatively informal manner and by way of example only. It has an ability to address a wide spectrum of security policy and security token obligations involved in creating an end-to-end solution. These security policy and security token obligations include, by way of example but not limitation: describing explicit trust relationships; expressing security token issuance policies; providing security tokens containing identities, attributes, capabilities, and/or delegation policies; expressing resource authorization and delegation policies; and so forth.

In a described implementation, SecPAL is a declarative, logic-based language for expressing security in a flexible and tractable manner. It can be comprehensive, and it can provide a uniform mechanism for expressing trust relationships, authorization policies, delegation policies, identity and attribute assertions, capability assertions, revocations, audit requirements, and so forth. This uniformity provides tangible benefits in terms of making the security scheme understandable and analyzable. The uniform mechanism also improves security assurance by allowing one to avoid, or at least significantly curtail, the need for semantic translation and reconciliation between disparate security technologies.

A SecPAL implementation may include any of the following example features: [1] SecPAL can be relatively easy to understand. It may use a definitional syntax that allows its assertions to be read as English-language sentences. Also, its grammar may be restrictive such that it requires users to understand only a few subject-verb-object (e.g., subject-verb phrase) constructs with cleanly defined semantics. Finally, the algorithm for evaluating the deducible facts based on a collection of assertions may rely on a small number of relatively simple rules.

[2] SecPAL can leverage industry standard infrastructure in its implementation to ease its adoption and integration into existing systems. For example, an extensible markup language (XML) syntax may be used that is a straightforward mapping from the formal model. This enables use of standard parsers and syntactic correctness validation tools. It also allows use of the W3C XML Digital Signature and Encryption standards for integrity, proof of origin, and confidentiality.

[3] SecPAL may enable distributed policy management by supporting distributed policy authoring and composition. This allows flexible adaptation to different operational models governing where policies, or portions of policies, are authored based on assigned administrative duties. Use of standard approaches to digitally signing and encrypting policy objects allow for their secure distribution. [4] SecPAL enables an efficient and safe evaluation. Simple syntactic checks on the inputs are sufficient to ensure evaluations will terminate and produce correct answers.

[5] SecPAL can provide a complete solution for access control requirements supporting required policies, authorization decisions, auditing, and a public-key infrastructure (PKI) for identity management. In contrast, most other approaches only manage to focus on and address one subset of the spectrum of security issues. [6] SecPAL may be sufficiently expressive for a number of purposes, including, but not limited to, handling the security issues for Grid environments and other types of distributed systems. Extensibility is enabled in ways that maintain the language semantics and evaluation properties while allowing adaptation to the needs of specific systems.

Figure 5:
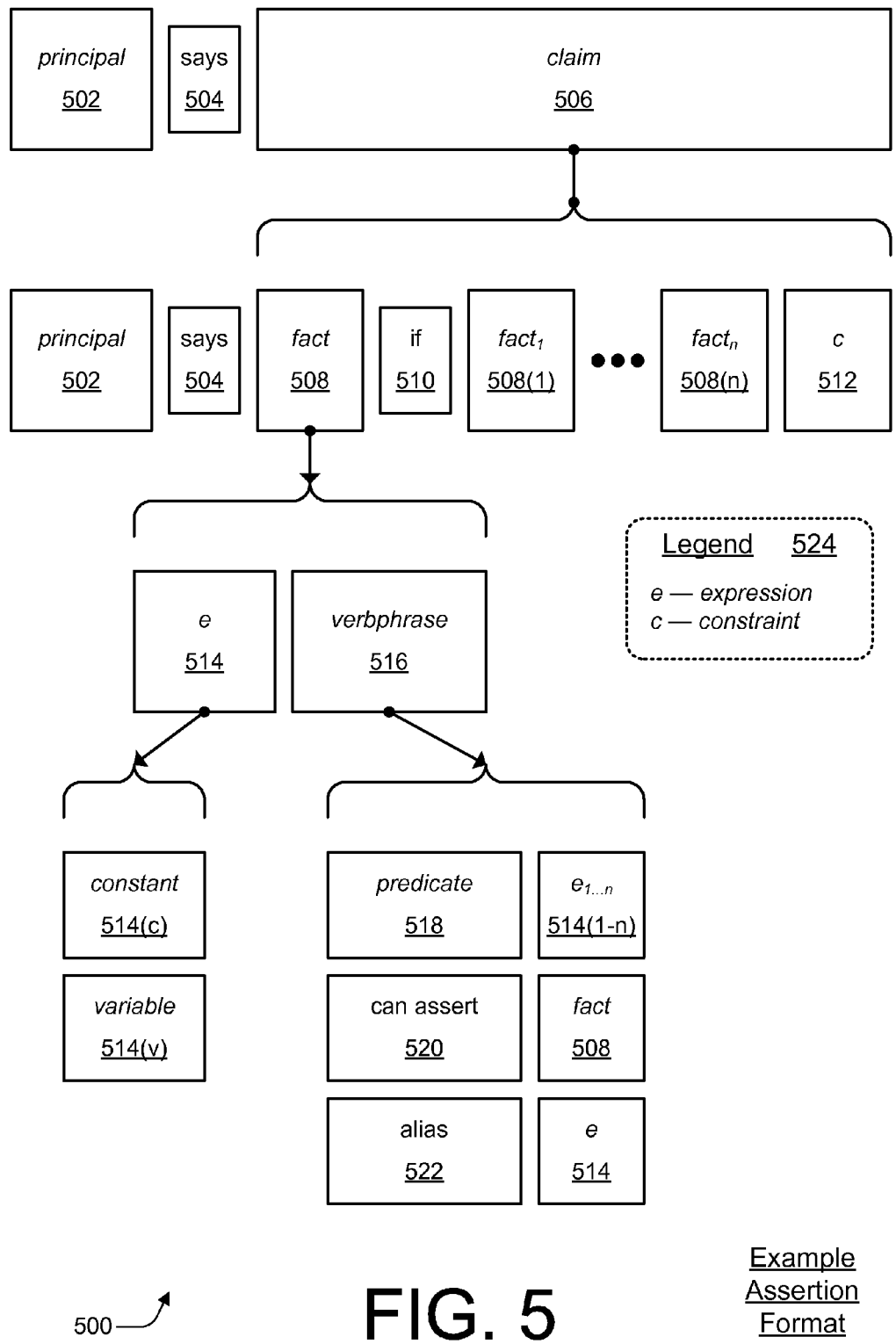
FIG. 5 is a block diagram illustrating an example assertion format for a general security scheme.

FIG. 5 is a block diagram illustrating an example assertion format 500 for a general security scheme. Security scheme assertions that are used in the implementations described otherwise herein may differ from example assertion format 500. However, assertion format 500 is a basic illustration of one example format for security scheme assertions, and it provides a basis for understanding example described implementation of various aspects of a general security scheme.

As illustrated at the top row of assertion format 500, an example assertion at a broad level includes: a principal portion 502, a says portion 504, and a claim portion 506. Textually, the broad level of assertion format 500 may be represented by: principal says claim.

At the next row of assertion format 500, claim portion 506 is separated into example constituent parts. Hence, an example claim portion 506 includes: a fact portion 508, an if portion 510, "n" conditional $fact_1 \ldots_n$ portions 508(1 . . . n), and a c portion 512. The subscript "n" represents some integer value. As indicated by legend 524, c portion 512 represents a constraint portion. Although only a single constraint is illustrated, c portion 512 may actually represent multiple constraints (e.g., $c_1, \ldots, c_m$). The set of conditional fact portions 508(1 . . . n) and constraints 512(1 . . . m) on the right-hand side of if portion 510 may be termed the antecedent.

Textually, claim portion 506 may be represented by: fact if $fact_1, \ldots, fact_n$, c. Hence, the overall assertion format 500 may be represented textually as follows: principal says fact if $fact_1, \ldots, fact_n$, c. However, an assertion may be as simple as: principal says fact. In this abbreviated, three-part version of an assertion, the conditional portion that starts with if portion 510 and extends to c portion 512 is omitted.

Each fact portion 508 may also be further subdivided into its constituent parts. Example constituent parts are: an e portion 514 and a verb phrase portion 516. As indicated by legend 524, e portion 514 represents an expression portion. Textually, a fact portion 508 may be represented by: e verbphrase.

Each e or expression portion 514 may take on one of two example options. These two example expression options are: a constant 514(c) and a variable 514(v). Principals may fall under constants 514(c) and/or variables 514(v).

Each verb phrase portion 516 may also take on one of three example options. These three example verb phrase options are: a predicate portion 518 followed by one or more $e_1 \ldots_n$ portions 514(1 . . . n), a can assert portion 520 followed by a fact portion 508, and an alias portion 522 followed by an expression portion 514. Textually, these three verb phrase options may be represented by: predicate $e_1 \ldots e_n$, can assert fact, and alias e, respectively. The integer "n" may take different values for facts 508(1 . . . n) and expressions 514(1 . . . n).

Generally, SecPAL statements are in the form of assertions made by a security principal. Security principals are typically identified by cryptographic keys so that they can be authenticated across system boundaries. In their simplest form, an assertion states that the principal believes a fact is valid (e.g., as represented by a claim 506 that includes a fact portion 508). They may also state a fact is valid if one or more other facts are valid and some set of conditions are satisfied (e.g., as represented by a claim 506 that extends from a fact portion 508 to an if portion 510 to conditional fact portions 508(1 . . . n) to a c portion 512). There may also be conditional facts 508(1 . . . n) without any constraints 512 and/or constraints 512 without any conditional facts 508(1 . . . n).

In a described implementation, facts are statements about a principal. Four example types of fact statements are described here in this section. First, a fact can state that a principal has the right to exercise an action(s) on a resource with an "action verb". Example action verbs include, but are not limited to, call, send, read, list, execute, write, modify, append, delete, install, own, and so forth. Resources may be identified by universal resource indicators (URIs) or any other approach.

Second, a fact can express the binding between a principal identifier and one or more attribute(s) using the "possess" verb. Example attributes include, but are not limited to, email name, common name, group name, role title, account name, domain name server/service (DNS) name, internet protocol (IP) address, device name, application name, organization name, service name, account identification/identifier (ID), and so forth. An example third type of fact is that two principal identifiers can be defined to represent the same principal using the "alias" verb.

"Qualifiers" or fact qualifiers may be included as part of any of the above three fact types. Qualifiers enable an assertor to indicate environmental parameters (e.g., time, principal location, etc.) that it believes should hold if the fact is to be considered valid. Such statements may be cleanly separated between the assertor and a relying party's validity checks based on these qualifier values.

An example fourth type of fact is defined by the "can assert" verb. This "can assert" verb provides a flexible and powerful mechanism for expressing trust relationships and delegations. For example, it allows one principal (A) to state its willingness to believe certain types of facts asserted by a second principal (B). For instance, given the assertions "A says B can assert fact0" and "B says fact0", it can be concluded that A believes fact0 to be valid and therefore it can be deduced that "A says fact0".

Such trust and delegation assertions may be (i) unbounded and transitive to permit downstream delegation or (ii) bounded to preclude downstream delegation. Although qualifiers can be applied to "can assert" type facts, omitting support for qualifiers to these "can assert" type facts can significantly simplify the semantics and evaluation safety properties of a given security scheme.

In a described implementation, concrete facts can be stated, or policy expressions may be written using variables. The variables are typed and may either be unrestricted (e.g., allowed to match any concrete value of the correct type) or restricted (e.g., required to match a subset of concrete values based on a specified pattern).

Security authorization decisions are based on an evaluation algorithm (e.g., that may be conducted at authorization engine 218) of an authorization query against a collection of assertions (e.g., an assertion context) from applicable security policies (e.g., a security policy 220) and security tokens (e.g., one or more security tokens 204). Authorization queries are logical expressions, which may become quite complex, that combine facts and/or conditions. These logical expressions may include, for example, AND, OR, and/or NOT logical operations on facts, either with or without attendant conditions and/or constraints.

This approach to authorization queries provides a flexible mechanism for defining what must be known and valid before a given action is authorized. Query templates (e.g., from authorization query table 224) form a part of the overall security scheme and allow the appropriate authorization query to be declaratively stated for different types of access requests and other operations/actions.

Example Implementations for Security Authorization Queries

Existing security policy languages follow one of two approaches. Some prevent the use of negations in all ways and at all times. This approach does reduce the attendant inconsistencies and uncertainties that can arise from negations. However, it is also limiting inasmuch as many security scenarios are rendered far more difficult to handle and some security scenarios simply cannot be handled at all. The other approach places no limitations on the use of negations. Although this approach is more flexible, it presents the possibility of establishing security policies that are convoluted or even nondeterministic.

In contrast, a described implementation creates a security scheme with multiple levels. In a bifurcated security scheme implementation, for example, there are two levels. A first level forbids the use of negations. This can be enforced using, for example, validations on syntax. A second level permits the use of negations. This bifurcated security scheme combines the safety and certainty of ensuring that security assertions are tractable and determinable with the flexibility of handling exclusionary security rules.

Figure 6:
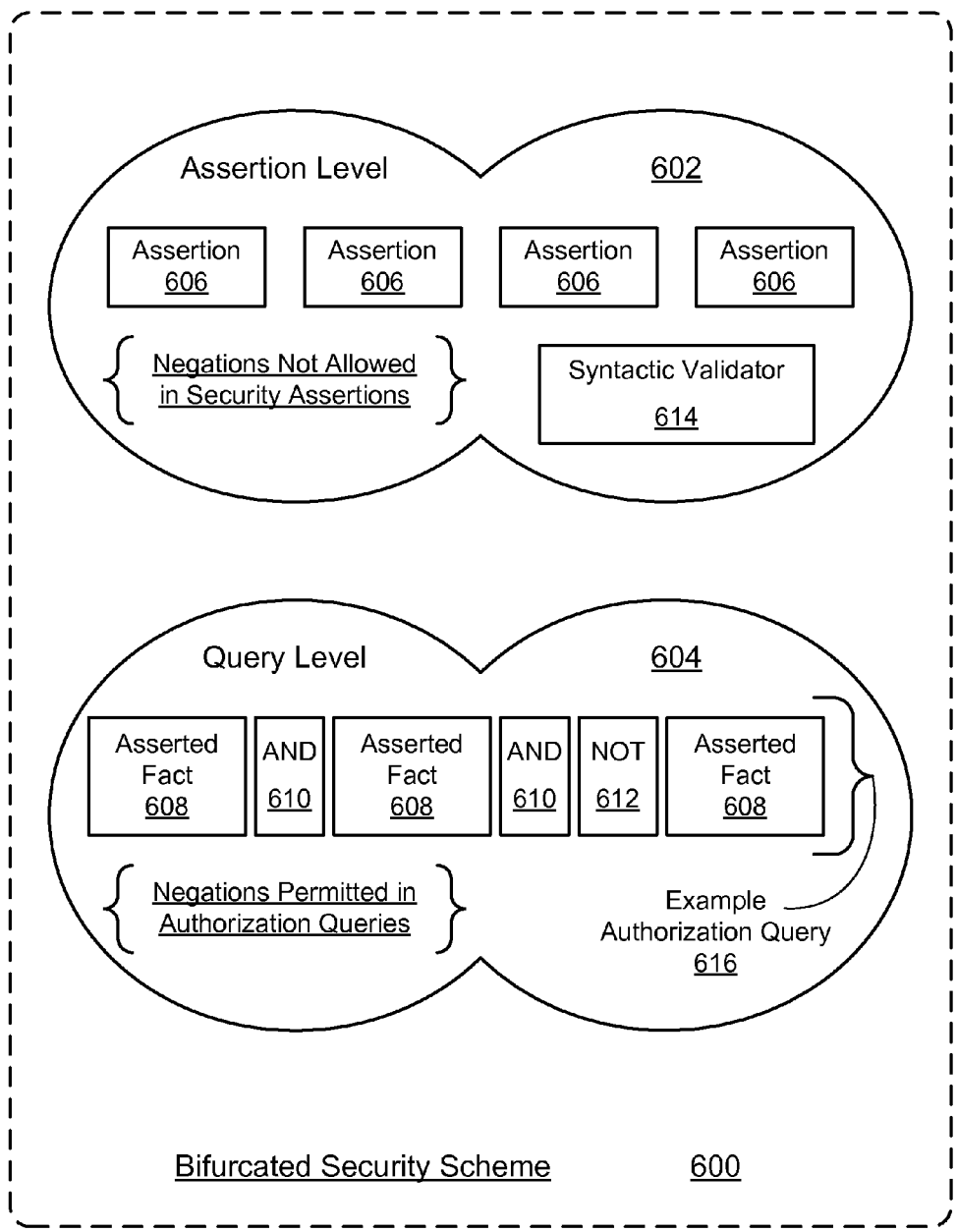
FIG. 6 is a block diagram illustrating an example bifurcated security scheme having a first level and a second level.

FIG. 6 is a block diagram illustrating an example bifurcated security scheme 600 having a first level and a second level. As illustrated, the first level comprises an assertion level 602, and the second level comprises a query level 604. Assertion level 602 includes multiple assertions 606 and a syntactic validator 614. Query level 604 includes an example authorization query 616 having multiple parts. Examples for these multiple parts include, but are not limited to, asserted facts 608 and logical operators 610 and 612.

In a described implementation, assertion level 602 is populated with assertions 606. Assertions 606 may be any type of declarative security statement at the assertion level. Examples of assertions 606 include, but are not limited to, token assertions and policy assertions. (These two assertion types are illustrated separately and explicitly in FIG. 7.) Negations are not allowed within security assertions 606. Syntactic validator 614 analyzes each assertion 606 to check if a negation is present. If a negation is present within a given assertion 606, then the given assertion 606 is rejected or disallowed.

Query level 604 is populated with authorization queries such as example authorization query 616. Authorization queries of query level 606 are permitted to include negations, such as NOT operator 612. Authorization queries may be structured in any manner. Although not specifically shown in FIG. 6, authorization queries may in general include one or more logical constraints.

In example authorization query 616, the query is structured as a Boolean logical operation. Such Boolean logical operations may include any number of asserted facts 608, any number of logical operators, and so forth. The asserted facts, logical operators, etc. may be combined in any manner. Example logical operators include, but are not limited to, AND, OR, NOT, and so forth. As illustrated, example authorization query 616 includes: three asserted facts 608, two AND operators 610, and one NOT operator 612.

Whether or not an asserted fact 608 is true depends on whether or not a valid matching assertion 606 can be deduced. After this matching determination procedure is completed, the resulting logical Boolean operation is evaluated. In the case of example authorization query 616, NOT operator 612 is applied to the TRUE/FALSE determination of the far right asserted fact 608 prior to applying AND operators 610. If the overall Boolean operation is evaluated to TRUE, then the authorization decision is affirmative. If the overall evaluation of the Boolean operation is FALSE, then the authorization decision is negative.

An example interrelationship between assertions 606 and authorization queries (e.g., example authorization query 616) is presented below in the description of FIGS. 7-10. An authorization query is ascertained responsive to a request, which may include or otherwise be associated with one or more assertions 606. The authorization query is then evaluated in conjunction with an overall assertion context, which includes assertions 606. The assertion context typically includes token assertions and policy assertions.

Figure 7:
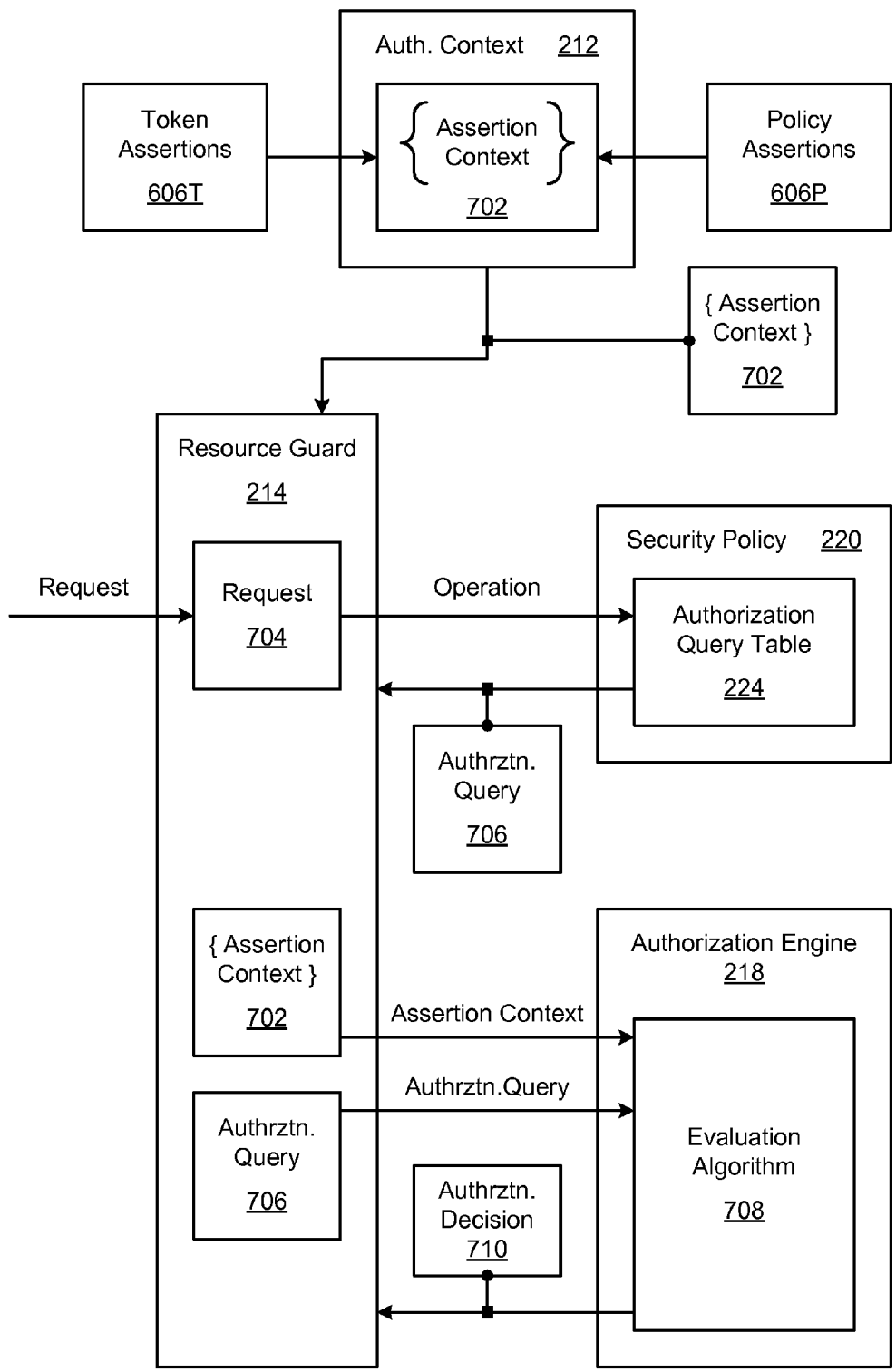
FIG. 7 is a general block diagram illustrating an example authorization query ascertainment and an example authorization query evaluation.

FIG. 7 is a general block diagram 700 illustrating an example authorization query ascertainment and an example authorization query evaluation. Block diagram 700 includes a number of the security-related components from FIGS. 2 and 3. As illustrated, it includes an authorization context 212, a resource guard 214, an authorization engine 218, and a security policy 220. Security policy 220 contains an authorization query table 224. Authorization engine 218 includes an evaluation algorithm 708.

In a described implementation, authorization context 212 includes an assertion context 702. Assertion context 702 is a collection of assertions 606. Specifically, assertion context 702 includes token assertions 606T and policy assertions 606P. Token assertions 606T derive from a security token (e.g., security token 204 of FIGS. 2 and 3). The security token may be passed as part of and/or along with a resource access request. Policy assertions 606P derive from a trust and authorization policy (e.g., a trust and authorization policy 222 module (of FIG. 2) of security policy 220).

Assertion context 702 is forwarded to resource guard 214. A request 704 is presented to resource guard 214. Request 704 is a request to access some resource. Resource guard 214 translates the request into an operation. The operation is provided to authorization query table 224. Authorization query table 224 maps resource-specific operations to authorization queries. In an example implementation, each operation is associated with a single authorization query. In response to the provided operation, security policy 220 ascertains the associated authorization query 706 and returns authorization query 706 to resource guard 214. Ascertaining authorization query 706 using an authorization query table 224 is described further herein below with particular reference to FIG. 8.

Hence, resource guard 214 includes both assertion context 702 and authorization query 706. Resource guard 214 forwards assertion context 702 and authorization query 706 to evaluation algorithm 708 of authorization engine 218. Evaluation algorithm 708 comprises logic that is capable of evaluating authorization query 706 in conjunction with assertion context 702. The logic may be implemented with hardware, software, firmware, some combination thereof, and so forth.

Thus, assertion context 702 is applied to authorization query 706 in evaluation algorithm 708. After a logical analysis, evaluation algorithm 708 produces an authorization decision 710. Evaluating an authorization query 706 in conjunction with an assertion context 702 is described further herein below with particular reference to FIG. 9.

Generally, a security language having the characteristics as described herein makes complex access control criteria relatively simple to write in a declarative manner and relatively simple to understand. It is compatible with any authorization algorithm that exposes a set of valid facts deduced based on an input policy and authenticated requestor data. As described further herein, it is based on the concept of an authorization query that is combined with an authorization decision algorithm in conjunction with an assertion context.

In a described implementation generally, an authorization query includes a set of asserted facts along with a constraint. The asserted facts are of the form "A says fact". They express a requirement that a matching valid assertion can be deduced (e.g., from the assertion context). If such a matching valid assertion is known, then the asserted fact is satisfied and evaluates to the Boolean value True; otherwise, it evaluates to False. (In some implementations, the assertor of the fact may be known implicitly based on the evaluation context. In these cases, it may be omitted.) A constraint is an expression that returns a Boolean value. This may include variables used in the asserted facts as well as references to environmental values (e.g., time, location, etc.). The constraint is typically used to express variable equalities and inequalities.

There is at least one asserted fact in each query. If multiple asserted facts are present, they may be combined using logical operators such as AND, OR, and NOT. The optional constraint is logically ANDed with the asserted facts.

A consequence of this approach is that the basic access control policy may be written in terms of positive statements about the access each principal is authorized without concern for the higher level structural requirements. Thus, in multiple principal policies, one can write each policy stating what rights to a resource each principal should potentially have. Such security policies are monotonic in the sense that the addition of new policy statements does not remove any existing access right. Moreover, one can write positive access policies indicating what rights a principal has to a set of resources without worrying about potential conflicts or inconsistencies. The authorization query provides the higher level semantics for combining these access control rules.

For example, if one required (i) a user with a "fabrikam.com" email address and (ii) the application with code digest value "ABC" to grant read access to "Foo", the access control rules may be written as follows:

A says p read Foo if p possess r{(emailName, *@fabrikam.com)}

A says p read Foo if p possess r{digest, ABC}

To ensure both a user and an application are authenticated requestors, an example authorization query is:

A says v1 read Foo AND A says v1 possess r{(emailName,*)} AND A says v2 read Foo AND A says v2 possess {(digest,*)}

Similarly, to require two authorized principals with "fabrikam.com" email addresses to have requested access to "Foo", the following security policy may be written:

A says p read Foo if p possess r{(emailName, *@fabrikam.com)}, and it may be combined with the following authorization query:

A say p1 read Foo AND A says p2 read Foo AND (p1!=p2).

In the above authorization query, the portion indicating that the "p1" variable cannot equal the "p2" variable is a constraint.

Denies or exclusions may be appropriately handled using this approach. For example, it is given that members of group A have read access to Foo and members of group B have read access to Bar, but simultaneous access is not allowed. One can enable the desired access with a security policy having two policy assertions written as follows:

A says p read Foo if p possess r{(group, A)}

A says p read Bar if p possess r{(group, B)}.

The exclusion can then be enforced using the following authorization query:

(A says v read Foo OR A says v read BAR) AND NOT (A says v read Foo AND A says v read BAR).

In a similar manner, one can exclude being in two roles at the same time, having multiple access rights (e.g., both read and delete) to a given resource at the same time, and so forth.

Figure 8:
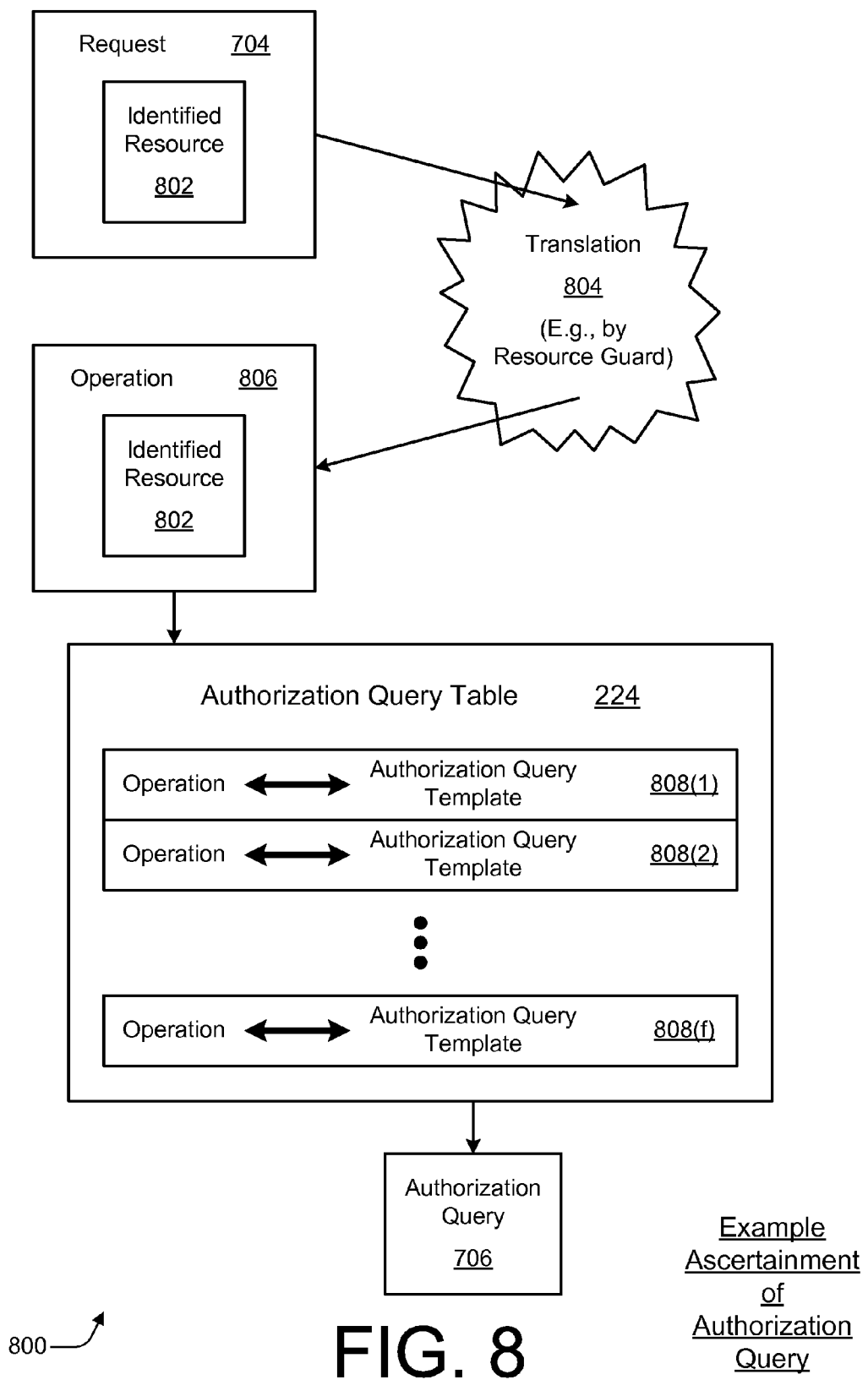
FIG. 8 is a more-specific block diagram illustrating an example authorization query ascertainment that is responsive to a resource access request.

FIG. 8 is a more-specific block diagram illustrating an example authorization query ascertainment 800 that is responsive to a resource access request 704. As illustrated, authorization query ascertainment 800 includes a request 704 having an identified resource 802, a translation function 804, an operation 806, an authorization query table 224, and an authorization query 706. Authorization query ascertainment 800 involves receiving a request 704 as input and producing an associated authorization query 706 as output.

In a described implementation, request 704 is a request to access some identified resource 802. Request 704 is translated via a translation function 804 into a resource-specific operation 806. This translation function 804 may be performed by, for example, resource guard 214 (of FIG. 7). Examples of resource-specific operations include, by way of example but not limitation, (i) reading and/or writing a file, (ii) sending data through a communications port, (iii) utilizing a processor, (iv) executing an application, and so forth.

Generally, operation 806 is provided to authorization query table 224. Security policy 220, for example, may be responsible for applying operation 806 to authorization query table 224 and retrieving the associated authorization query 706. Authorization query 706 is produced as a result and returned to resource guard 214.

More specifically, authorization query table 224 includes multiple fields 808. Each field 808 maps a resource-specific operation to an associated authorization query template. As illustrated, there are "f", with "f" being some integer, fields 808(1), 808(2) . . . 808(f) in authorization query table 224. A retrieved authorization query template is returned to resource guard 214. Resource guard 214 then performs a substitution procedure to produce authorization query 706. In other words, to create authorization query 706, resource guard 214 substitutes the actual requesting principal, the actual requested resource, etc. into predetermined corresponding slots of the associated authorization query template.

Figure 9:
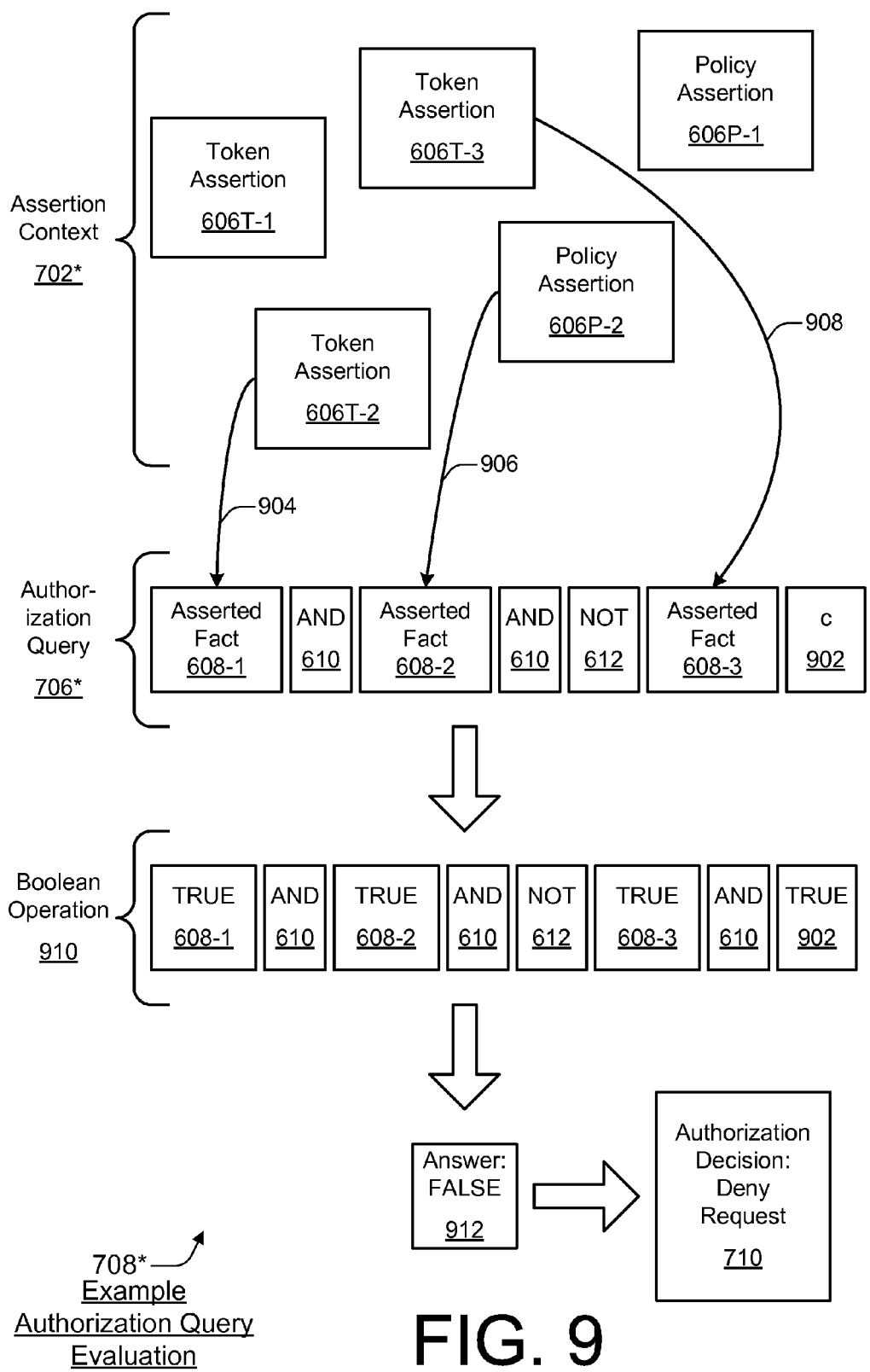
FIG. 9 is a more-specific block diagram illustrating an example authorization query evaluation given an assertion context.

FIG. 9 is a more-specific block diagram illustrating an example authorization query evaluation 708* given an assertion context 702*. As described generally above with reference to FIG. 7, evaluation algorithm 708 receives an authorization query 706 and an assertion context 702. In the specific example authorization evaluation 708* of FIG. 9, a specific example authorization query 706* is evaluated in conjunction with a specific example assertion context 702*. Actual assertion contexts 702, authorization queries 706, and evaluation algorithms 708 may differ from these examples.

As illustrated, example authorization query evaluation 708* includes an example assertion context 702*, an example authorization query 706*, a resulting Boolean operation 910, and an answer 912. Assertion context 702* includes (i) three token assertions 606T-1, 606T-2, and 606T-3 and (ii) two policy assertions 606P-1 and 606P-2. Example authorization query 706* includes three asserted facts 608-1, 608-2, and 608-3; two AND operators 610; one NOT operator 612; and one constraint 902.

During an evaluation, authorization engine 218 (of FIG. 7) attempts to determine if a valid matching assertion 606 can be deduced for each asserted fact 608 of authorization query 706*. This matching determination process may be iterative, recursive, and/or branching as one valid assertion leads to another possibly-valid assertion. After some definite period of time, the matching determination process converges.

Example authorization query evaluation 708* of FIG. 9 illustrates a simplified evaluation algorithm to facilitate a general understanding of the conceptual underpinnings of evaluating an authorization query. A more specific and technically accurate explanation is presented below after the description of FIG. 9. Moreover, a relatively-rigorous, logical description of an example implementation is presented herein below after the description of FIG. 10.

In example authorization query evaluation 708*, it is determined by authorization engine 218 that token assertion 606T-2 is valid and matches 904 asserted fact 608-1. It is also determined that policy assertion 606P-2 is valid and matches 906 asserted fact 608-2 and that token assertion 606T-3 is valid and matches 908 asserted fact 608-3. Although token assertion 606T-1 and policy assertion 606P-1 do not explicitly match a particular asserted fact 608, they may have been used in the matching determination process. Additionally, a TRUE/FALSE determination is made with respect to constraint 902.

After and/or during the matching determination process, a TRUE/FALSE replacement process is carried out to create a Boolean operation 910. If a particular asserted fact 608 has a matching valid assertion 606, the particular asserted fact 608 is replaced with "TRUE". If not, the particular asserted fact 608 is replaced with "FALSE". Any constraints 902 are likewise replaced with their determined "TRUE" or "FALSE" status. Although not specifically shown with authorization query 706*, constraints 902 are logically ANDed to the remainder of the authorization query.

For example authorization query evaluation 708*, authorization query 706* may be textually indicated as follows: asserted fact 608-1, AND operator 610, asserted fact 608-2, AND operator 610, NOT operator 612, asserted fact 608-3, and constraint 902. After the replacement process, the resulting Boolean operation may be textually indicated as follows: TRUE AND TRUE AND NOT TRUE AND TRUE. This reduces to: TRUE AND TRUE AND FALSE AND TRUE, which is logically FALSE.

Consequently, answer 912 for Boolean operation 910 is "FALSE". Hence, authorization decision 710 is to deny the request. If, on the other hand, there had not been, for example, a matching 908 assertion 606 for asserted fact 608-3, Boolean operation 910 would have reduced to: TRUE AND TRUE AND TRUE AND TRUE, which is logically TRUE. In this case, answer 912 would be "TRUE", and authorization decision 710 would be to permit the request. Although not explicitly shown or described, there are other permutations in which Boolean operation 910 would evaluate to being logically FALSE (e.g., if it were determined that there is no valid and matching 906 assertion 606 for asserted fact 608-2).

A more technically accurate example implementation for evaluating an authorization query is described here. Firstly, the asserted facts inside an authorization query are evaluated one at a time, and not necessarily all at once prior to a complete replacement process. Secondly, the evaluation of a single asserted fact inside an authorization query returns a set of variable substitutions that make the asserted fact true. Thus, in general, the returned value is not immediately a TRUE/FALSE status because facts are actually denoted as having a TRUE/FALSE status with respect to a given variable substitution.

If the connective between two asserted facts inside an authorization query is AND (as is the case in the example of FIG. 9), the returned value (i.e., the set of substitutions) of the fact on the left hand side is applied to the fact on the right hand side. Afterwards, the fact on the right hand side is evaluated as necessary. The resulting sets of substitutions are then combined by substitution composition. A result of evaluating the entire authorization query is a set of substitutions, each substitution of the set of substitutions capable of making the authorization query true.

Figure 10:
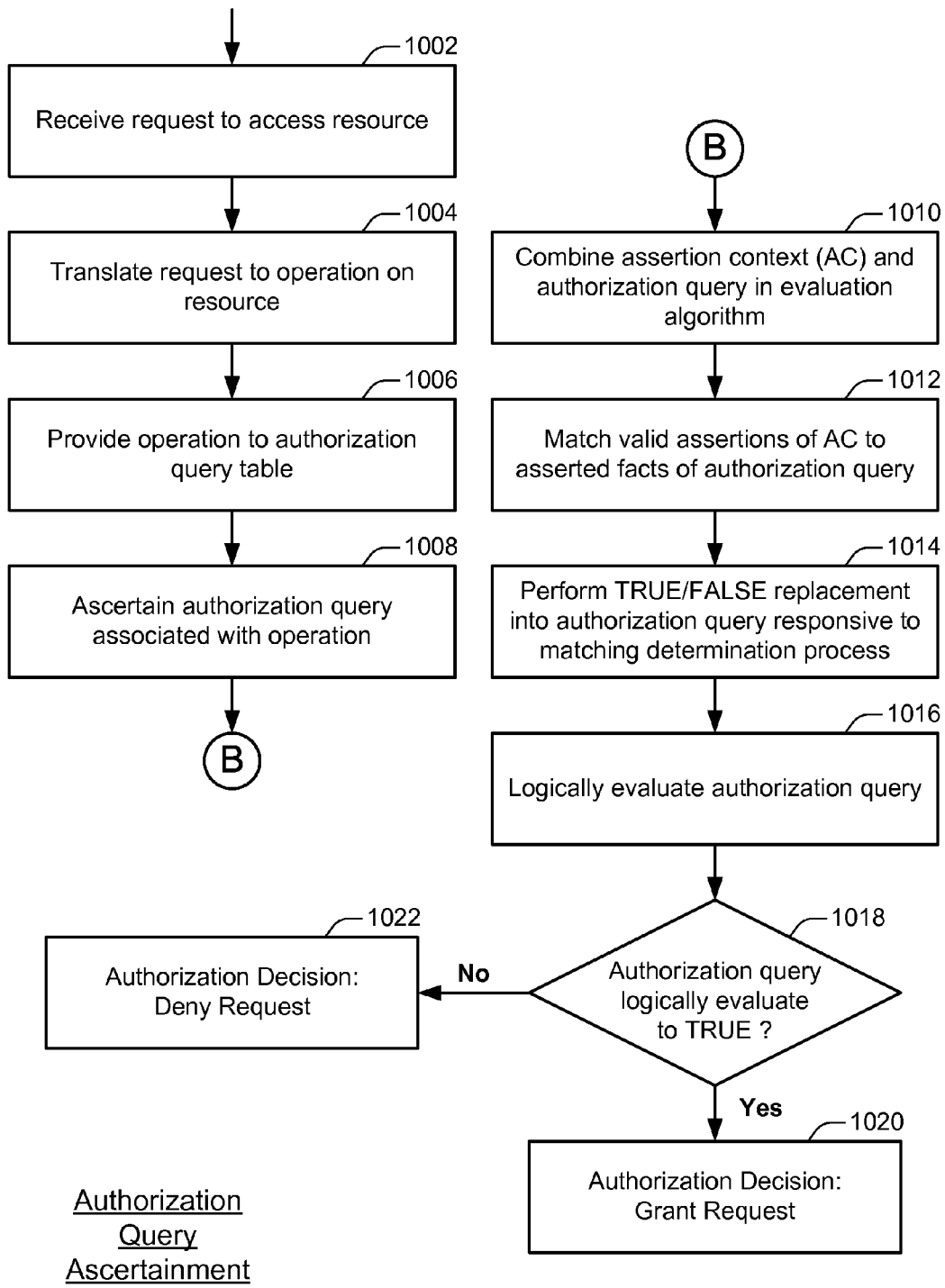
FIG. 10 is a flow diagram that illustrates an example of a method for ascertaining and evaluating an authorization query.

FIG. 10 is a flow diagram 1000 that illustrates an example of a method for ascertaining and evaluating an authorization query. Flow diagram 1000 includes eleven (11) blocks 1002-1022. Although the actions of flow diagram 1000 may be performed in other environments and with a variety of hardware/software/firmware combinations, some of the features, components, and aspects of FIGS. 1-9 are used to illustrate an example of the method. For example, a resource guard 214, an authorization query table 224, and/or an authorization engine 218 may separately or jointly implement the actions of flow diagram 1000.

In a described implementation, at block 1002, a request to access a resource is received. For example, a request 704 that identifies a resource 802 may be received. At block 1004, the request is translated to an operation on resource. For example, a resource guard 214 may translate 804 request 704 into a resource-specific operation 806.

At block 1006, the operation is provided to an authorization query table. For example, resource-specific operation 806 may be provided to authorization query table 224. At block 1008, an authorization query that is associated with the operation is ascertained. For example, a field 808 that includes resource-specific operation 806 may be located. The associated authorization query may then be retrieved from the located field 806.

More specifically, the retrieved authorization query may comprise an authorization query template. The associated authorization query template is converted into the authorization query by substituting actual principals, resources, etc. into predetermined corresponding slots of the authorization query template based on the security tokens provided by the requestor. In an example implementation, resource guard 214, which knows the actual variable information from request 704, performs this conversion by substitution.

At block 1010, an assertion context and the authorization query are combined in an evaluation algorithm. For example, an assertion context 702 and authorization query 706 may be jointly submitted to evaluation algorithm 708.

At block 1012, the valid assertions of the assertion context are matched to asserted facts of the authorization query in a matching determination process. For example, one or more token assertions 606T and/or policy assertions 606P, which are deducible from assertion context 702 (i.e., originally present therein and/or otherwise derivable there from), that are found to be valid may be attempted to be matched 904/906/908 to asserted facts 608 in a matching determination process. Any constraint portions 902 of authorization query 706 are also analyzed to determine whether they are TRUE or FALSE. As noted above in the technical description, each assertion may be analyzed separately and/or sequentially.

At block 1014, a TRUE/FALSE replacement into the authorization query is performed responsive to the matching determination process. For example, asserted facts 608 that are determined to have a valid matching assertion 606 may be replaced with TRUE, and asserted facts 608 that are not determined to have a valid matching assertion 606 may be replaced with FALSE in a Boolean operation 910. It should be understood that the action(s) of block 1014 may be performed in a manner that is fully or partially overlapping with the performance of the action(s) of block 1012.

At block 1016, the authorization query is logically evaluated. For example, Boolean operation 910 may be logically evaluated as part of evaluation algorithm 708 to determine if its answer is TRUE or FALSE. It should be understood that a result of Boolean operation 910 may be determinable, and indeed may be determined, without replacing each asserted fact 608 and/or constraint 902 with a TRUE or FALSE status.

At block 1018, it is determined if the authorization query logically evaluates to "TRUE". If so, the authorization decision at block 1020 is that the request is granted. If, on the other hand, it is determined that the authorization query logically evaluates to "FALSE", the authorization decision at block 1022 is that the request is denied. It should be understood that an algorithmic evaluation of an authorization query that may have a "TRUE" status may return a set of variables that renders the authorization query "TRUE".

Security authorization queries may also be described from a relatively-rigorous, logical perspective. In a described logical implementation of security authorization queries, authorization requests are decided by querying an assertion context, which contains local as well as imported assertions. In an example implementation, an authorization query may comprise a collection of atomic queries of the form A says fact and constraints c. These atomic queries and constraints are combined by logical connectives, including negation. Example logical connectives include the following:

$$q ::= e \text{ says fact}$$
$$\mid q_1, q_2$$
$$\mid q_1 \text{ or } q_2$$
$$\mid \text{not}(q)$$
$$\mid c$$

The resulting query language is more expressive than in other logic-based languages where only atomic queries are considered. For example, separation of duties, threshold, and denying policies can be expressed by composing atomic queries with negation and constraints. Negation is not allowed at the assertion level of the language because coupling negation with a recursive language results in semantic ambiguities, and often to higher computational complexity or even undecidability. By restricting the use of negation to the level of authorization queries (rather than adding these features to the assertion language proper), the negation is effectively separated from recursion, thereby circumventing the problems usually associated with negation.

The semantics of queries are defined by the relation $AC, \theta \vdash q$. In the following, let AC be an assertion context. Also, let $\theta$ be a substitution, and let $\epsilon$ be the empty substitution. Let $Dom(\theta)$ be the domain of the substitution $\theta$. If X is a phrase of syntax, let $Vars(X)$ be the set of variables occurring in X. An example formal semantics for authorization queries is as follows:

| | |
|---|---|
| $AC, \theta \vdash e$ says fact | if $e\theta$ says fact$\theta$ is deducible from AC, and $Dom(\theta) \subseteq Vars(e$ says fact$)$ |
| $AC, \theta_1\theta_2 \vdash q_1, q_2$ | if $AC, \theta_1 \vdash q_1$ and $AC, \theta_2 \vdash q_2\theta_1$ |
| $AC, \theta \vdash q_1$ or $q_2$ | if $AC, \theta \vdash q_1$ or $AC, \theta \vdash q_2$ |
| $AC, \epsilon \vdash \text{not}(q)$ | if $AC, \epsilon \vdash q$ does not hold and $Vars(q) = \phi$ |
| $AC, \epsilon \vdash c$ | if $Vars(c) = \phi$ and c is valid. |

Given a query q and an authorization context AC, an authorization algorithm returns the set of substitutions $\theta$ such that $AC, \theta \vdash q$. If the query is ground, the answer set is either empty (meaning "no" the request is denied) or a singleton set containing the empty substitution $\epsilon$ (meaning "yes" the request is granted). If the query contains variables, then the substitutions in the answer set are the variable assignments that make the query true.

With regard to authorization query tables, they may be part of the local security policy and may be kept separate from imperative code. The table provides an interface to authorization queries by mapping parameterized method names to queries. Upon a request, the resource guard calls a method (e.g., instead of issuing a query directly) that gets mapped by the table to an authorization query, which is then used to query the assertion context.

For example, an authorization query table may contain the following example mapping:
 canAuthorizePayment(requester, payment):
  Admin says requester possesses BankManagerID id,
  not(Admin says requester has initiated payment).
If Alice attempts to authorize the payment Payment47, for instance, the resource guard calls canAuthorizePayment(Alice, Payment47), which triggers the following query:
 Admin says Alice possesses BankManagerID id,
 not(Admin says Alice has initiated Payment47).
The resulting answer set (e.g., either an empty set if the request should be denied or a variable assignment for id) is returned to the resource guard, which can then enforce the policy.

The formal evaluation of security authorization queries may also be described from a relatively-rigorous, logical perspective. The following description assumes the existence of another algorithm that returns the set of substitutions for which a given statement of the form "e says fact" is deducible from an authorization context AC. Such an algorithm may, for example, rely on translating AC into another logical language such as Datalog. The function $\text{AuthAns}_{AC}$ is defined on authorization queries as follows:

$$\text{AuthAns}_{AC}(e \text{ says fact}) =$$
$$\{\theta \mid e\theta \text{ says fact}\theta \text{ is deducible from } AC \text{ and } Dom(\theta) \subseteq$$
$$\text{Vars}(e \text{ says fact})\}$$
$$\text{AuthAns}_{AC}(q_1, q_2) = \{\theta_1\theta_2 \mid \theta_1 \in \text{AuthAns}_{AC}(q_1) \text{ and } \theta_2 \in$$
$$\text{AuthAns}_{AC}(q_2\theta_1)\}$$
$$\text{AuthAns}_{AC}(q_1 \text{ or } q_2) = \text{AuthAns}_{AC}(q_2) \cup \text{AuthAns}_{AC}(q_2)$$
$$\text{AuthAns}_{AC}(\text{not}(q)) = \{\varepsilon\} \quad \text{if } \text{Vars}(q) = \phi \text{ and } \text{AuthAns}_{AC}(q) = \phi$$
$$= \phi \quad \text{if } \text{Vars}(q) = \phi \text{ and } \text{AuthAns}_{AC}(q) \neq \phi$$
$$= \text{undefined otherwise}$$
$$\text{AuthAns}_{AC}(c) = \{\varepsilon\} \quad \text{if } \text{Vars}(c) = \phi \text{ and } c \text{ is valid}$$
$$= \phi \quad \text{if } \text{Vars}(c) = \phi \text{ and } c \text{ is not valid}$$
$$= \text{undefined otherwise}$$

The following theorem shows that $\text{AuthAns}_{AC}$ is an algorithm for evaluating safe authorization queries. This theorem represents the finiteness, soundness, and completeness of authorization query evaluations: For all safe assertion contexts AC and safe authorization queries q,
1. $\text{AuthAns}_{AC}(q)$ is defined and finite, and
2. $AC, \theta \vdash q$ iff $\theta \in \text{AuthAns}_{AC}(q)$.

The devices, actions, aspects, features, functions, procedures, modules, data structures, protocols, components, etc. of FIGS. 1-10 are illustrated in diagrams that are divided into multiple blocks. However, the order, interconnections, interrelationships, layout, etc. in which FIGS. 1-10 are described and/or shown are not intended to be construed as a limitation, and any number of the blocks can be modified, combined, rearranged, augmented, omitted, etc. in any manner to implement one or more systems, methods, devices, procedures, media, apparatuses, APIs, protocols, arrangements, etc. for security authorization queries.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A method comprising:
under control of one or more processors:
receiving a request for access to a resource;
applying, by the one or more processors, a multi-level security scheme to the request for access, the multi-level security scheme including an assertion level and a query level, wherein the assertion level disallows an assertion containing a negation, and wherein the query level permits an authorization query containing at least one negation; and
determining, by the one or more processors, an authorization result for the request, based at least on the application of the multi-level security scheme.

2. The method of claim 1, further comprising ascertaining the authorization query by applying an authorization query table to the request.

3. The method of claim 1, wherein the authorization query is an English-language expression.

4. The method of claim 1, further comprising:
translating the request for access to an operation to be performed on the resource; and
ascertaining the authorization query associated with the operation, based on an authorization query table included in the multi-level security scheme.

5. The method of claim 4, wherein the authorization query table maps one or more resource-specific operations to one or more associated authorization queries.

6. The method of claim 1, further comprising auditing the determination of the authorization result, based on an audit policy.

7. The method of claim 1, wherein the assertion level includes a syntactic validator for disallowing the assertion containing the negation.

8. The method of claim 1, wherein the authorization query is a logical operation.

9. A system comprising:
one or more processors; and
one or more security components executed by the one or more processors to implement a multi-level security scheme that includes an assertion level and a query level, wherein the one or more security components perform actions including:
receiving a request to access a resource;
forming an assertion context at the assertion level, including disallowing an assertion containing a negation;
ascertaining an authorization query at the query level, based at least on an authorization query table; and
employing the authorization query and the assertion context to produce an authorization decision for the request to access the resource.

10. The system of claim 9, wherein the one or more security components include an audit component that audits the operation of at least one of the other security components.

11. The system of claim 9, wherein the actions further include permitting at least one negation within the authorization query, at the query level.

12. The system of claim 9, wherein the request includes a security token that includes one or more token assertions, and wherein the actions further include combining the one or more token assertions with one or more policy assertions to form the assertion context at the assertion level.

13. The system of claim 9, wherein disallowing the assertion containing the negation is performed using syntactic validation at the assertion level.

14. The system of claim 9, wherein the authorization query is a logical operation that includes at least one asserted fact and at least one logical operator.

15. The system of claim 9, wherein the actions further include:
translating the request into an operation to be performed on the resource;
providing the operation to the authorization query table that maps one or more resource-specific operations to one or more associated authorization queries; and
retrieving the authorization query associated with the operation, based on the mapping included in the authorization query table.

16. One or more computer-readable storage devices storing instructions that, when executed, configure one or more processors to perform actions comprising:

receiving a request to access a resource, wherein the request includes a security token with one or more token assertions;

applying a multi-level security scheme to the request for access, the multi-level security scheme including a first level and a second level;

determining an assertion context at the first level, based on the one or more token assertions;

employing syntactic validation to disallow an assertion containing a negation, at the first level;

ascertaining an authorization query at the second level; and employing the authorization query and the assertion context to produce an authorization decision for the request to access the resource.

17. The one or more computer-readable storage devices of claim 16, wherein the actions further comprise auditing one or more of the actions based on an audit policy.

18. The one or more computer-readable storage devices of claim 16, wherein determining the assertion context includes combining the one or more token assertions with one or more policy assertions to form the assertion context.

19. The one or more computer-readable storage devices of claim 18, wherein the one or more policy assertions include at least one of a trust-related assertion and an authorization-related assertion.

20. The one or more computer readable storage devices of claim 16, wherein the second level permits at least one negation within the authorization query.

* * * * *